(12) United States Patent
Watanabe et al.

(10) Patent No.: US 9,950,692 B2
(45) Date of Patent: Apr. 24, 2018

(54) ON-BOARD COMMUNICATION SYSTEM, AND PORTABLE DEVICE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Akiyo Watanabe, Yokkaichi (JP); Atsushi Ogawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 15/311,733

(22) PCT Filed: Jul. 27, 2015

(86) PCT No.: PCT/JP2015/071208
§ 371 (c)(1),
(2) Date: Nov. 16, 2016

(87) PCT Pub. No.: WO2016/013678
PCT Pub. Date: Jan. 28, 2016

(65) Prior Publication Data
US 2017/0080899 A1    Mar. 23, 2017

(30) Foreign Application Priority Data
Jul. 25, 2014 (JP) .................. 2014-152092

(51) Int. Cl.
*B60R 25/01* (2013.01)
*B60R 25/04* (2013.01)
*B60R 25/24* (2013.01)

(52) U.S. Cl.
CPC ............ *B60R 25/241* (2013.01); *B60R 25/01* (2013.01); *B60R 25/04* (2013.01); *B60R 25/245* (2013.01);
(Continued)

(58) Field of Classification Search
None
See application file for complete search history.

(56) References Cited

U.S. PATENT DOCUMENTS 6,199,045 B1 * 3/2001 Giniger ............... H04L 63/0428
340/990
6,664,899 B1 * 12/2003 Tsuchihashi .......... B60R 25/245
180/287
(Continued)

FOREIGN PATENT DOCUMENTS

DE   102011104230 A1    4/2012
JP   2002364223 A      12/2002
(Continued)

OTHER PUBLICATIONS

U.S. Appl. No. 15/311,724, filed Nov. 16, 2016 in the name of Akiyo Watanabe.
(Continued)

*Primary Examiner* — Shelley Chen
(74) *Attorney, Agent, or Firm* — Oliff PLC

(57) ABSTRACT

In an on-board communication system, an on-board device transmits detection signals from a plurality of antennas disposed in a vehicle, and a plurality of portable devices each receive the detection signals and transmit response signals corresponding to the received detection signals. Each
(Continued)

portable device measures an elapsed time from when the processing start signal is received, and (i) transmits a first response signal that includes information corresponding to the received detection signals, and (ii) when a specified time has elapsed from receipt of the processing start signal, transmits a second response signal including the same information as the information included in the first response signal. Position detection of the portable devices is performed based on the response signals.

10 Claims, 22 Drawing Sheets

(52) U.S. Cl.
CPC ....... *B60R 2325/10* (2013.01); *B60R 2325/20* (2013.01)

(56) References Cited

U.S. PATENT DOCUMENTS

| | | | | |
|---|---|---|---|---|
| 2001/0028297 | A1* | 10/2001 | Hara | B60R 25/246 340/5.62 |
| 2006/0083406 | A1* | 4/2006 | Ishimura | B60R 25/24 382/106 |
| 2008/0258866 | A1 | 10/2008 | Nakajima et al. | |
| 2008/0262772 | A1* | 10/2008 | Luinge | A61B 5/1114 702/94 |
| 2010/0231354 | A1* | 9/2010 | Nishiguchi | H04L 63/08 340/5.8 |
| 2010/0231465 | A1 | 9/2010 | Tanaka | |
| 2012/0092129 | A1 | 4/2012 | Lickfelt | |
| 2012/0271487 | A1 | 10/2012 | Lickfelt et al. | |
| 2014/0074320 | A1* | 3/2014 | Nishida | B60R 16/0232 701/2 |

FOREIGN PATENT DOCUMENTS

| | | | |
|---|---|---|---|
| JP | 2006348497 A | * | 12/2006 |
| JP | 2010-219628 A | | 9/2010 |
| JP | 2010-236346 A | | 10/2010 |
| JP | 2011-144624 A | | 7/2011 |
| JP | 2012-184609 A | | 9/2012 |
| WO | 2015-107609 A1 | | 7/2015 |

OTHER PUBLICATIONS

U.S. Appl. No, 15/311,760, filed Nov. 16, 2016 in the name of Akiyo Watanabe et al.

Aug. 18, 2015 Written Opinion of the International Searching Authority issued in International Patent Application No. PCT/JP2015/071222.

Oct. 6, 2015 Written Opinion of the International Searching Authority issued in International Patent Application No. PCT/JP2015/071208.

Oct. 6, 2015 Written Opinion of the International Searching Authority issued in International Patent Application No. PCT/JP2015/071220.

Jul. 6, 2017 Office Action issued in U.S. Appl. No. 15/311,760.

* cited by examiner

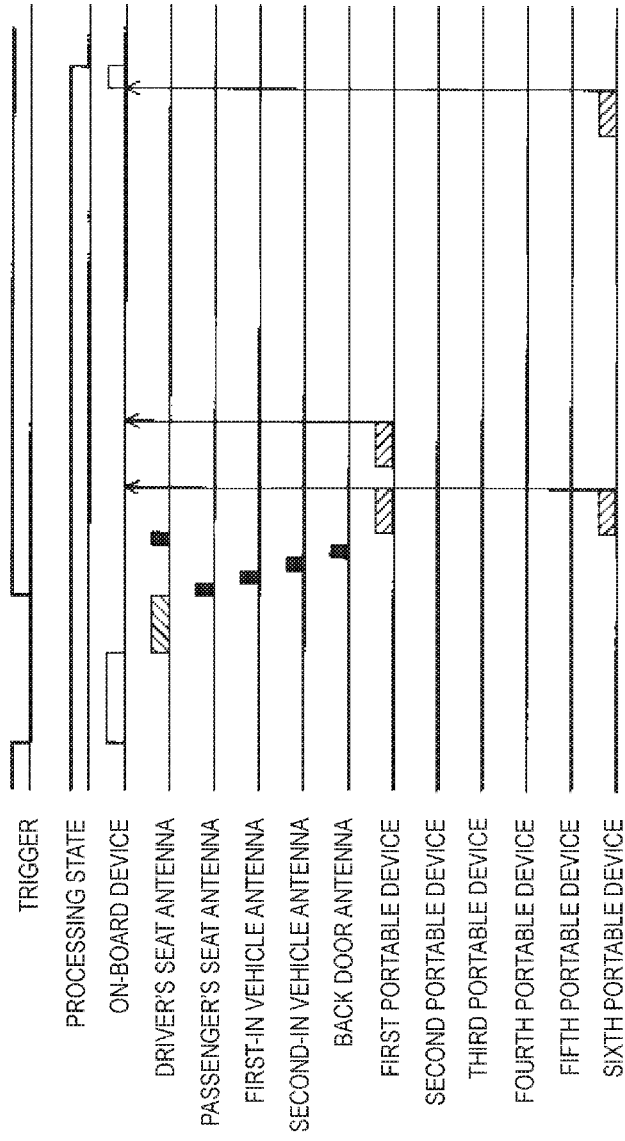

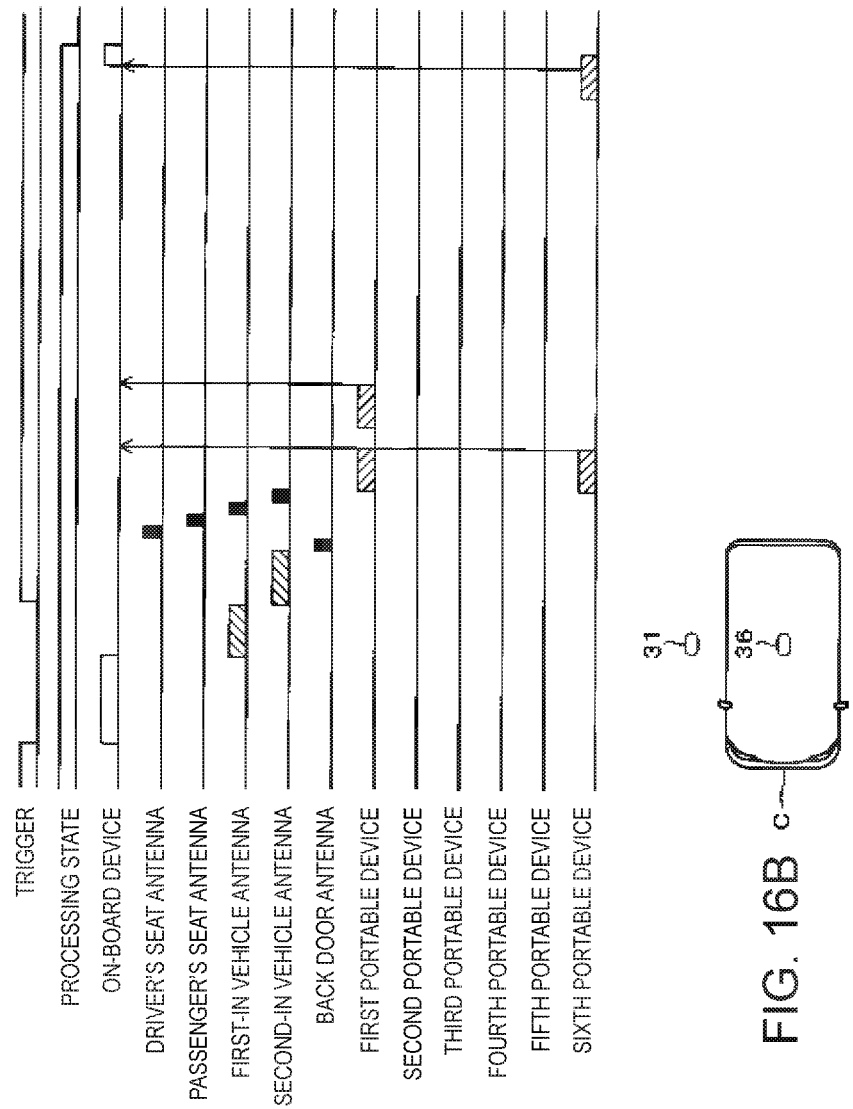

ON-BOARD COMMUNICATION SYSTEM, AND PORTABLE DEVICE

This invention relates to an on-board communication system, and to a portable device that constitutes the on-board communication system.

BACKGROUND

Passive entry systems are being utilized, which enable locking and unlocking of vehicle doors without the use of a mechanical key. Passive entry systems are constituted by (i) a portable device possessed by a user, (ii) a contact sensor that detects the user has grasped the door handle, (iii) an on-board device that detects the position of the portable device when the user grasps the door handle, and performs vehicle door locking processing or unlocking processing, and the like.

When the contact sensor detects that the user has grasped the door handle, the on-board device transmits wake-up signals from a plurality of LF transmitting antennas provided in the vehicle, and activates the portable device. The activated portable device transmits to the on-board device a specified signal indicating its existence. When the on-board device receives the specified signal, it transmits, from LF transmitting antennas, detection signals for detecting the position of the portable device. The portable device receives the detection signals transmitted from the various LF transmitting antennas, and measures the received signal strengths. The portable device then transmits information regarding the measured received signal strengths to the on-board device. The portable device receives the information regarding the measured received signal strengths from the portable device, determines whether the portable device is outside the vehicle, and performs processing corresponding to the determination result. For example, if the portable device is positioned outside the vehicle, the on-board device performs vehicle door locking processing or unlocking processing.

In Publication JP-A-2010-236346 (P2010-236346), an on-board device and a portable device are disclosed that can shorten processing time. The on-board device improves communication processing speed by simultaneously transmitting signals, with a phase difference provided, from a plurality of LF transmitting antennas inside the vehicle.

Meanwhile, in a conventional passive entry system, when there are a plurality of portable devices, a portable device is activated for each LF transmitting antenna, and transmitting and receiving of information necessary for determining whether the activated portable devices are inside or outside the vehicle is separately performed for each portable device.

FIG. 22 is a timing chart that shows signals transmitted and received in conventional portable device position detection processing. In a vehicle, there are provided first through fifth LF transmitting antennas that transmit detection signals for detecting the position of portable devices, and an on-board device transmits various signals such as detection signals from each LF transmitting antenna, and thereby detects the position of the portable devices. There are six portable devices that constitute the passive entry system, and the respective portable devices are labeled the first portable device through the sixth portable device. In FIG. 22, "on-board device" is a timing chart showing the processing execution state of an on-board control unit provided in the on-board device. In FIG. 22, "first LF transmitting antenna" through "fifth LF transmitting antenna" are timing charts showing the timing of transmitting signals from the various LF transmitting antennas, and "first portable device" through "sixth portable device" are timing charts showing the timing of transmitting signals from the first through sixth portable devices.

As shown in FIG. 22, in specified cases, the on-board device transmits a wake-up signal from the first LF transmitting antenna. In FIG. 22, the rectangular portions with downward-left hatching show the timing at which the wake-up signal is transmitted. The wake-up signal is transmitted toward the first through sixth portable devices. Each portable device for which the wake-up signal is successfully received is activated from a sleep state, and transmits to the portable device an ID signal indicating its own existence. In FIG. 22, the rectangular portions with an x-mark show the timing at which ID signals are transmitted. In the example shown in FIG. 22, the first portable device and the second portable device have successfully received the wake-up signal, and each portable device is transmitting its own ID signal to the on-board device.

The on-board device, which has received the ID signals, separately sends detection signals to each activated portable device. For example, when the first portable device and the second portable device have been activated, the on-board device first sends detection signals to the first portable device from the first through sixth LF transmitting antennas. In FIG. 22, the solid black rectangular portions show the timing at which detection signals for detecting portable device position are transmitted. The first portable device measures the received signal strengths of the detection signals, and transmits to the on-board device a response signal that includes the received signal strengths obtained by the measurements. In FIG. 22, the rectangular portions with downward-right hatching show the timing at which response signals are transmitted. The on-board device receives the response signal from the first portable device, and performs position detection for the first portable device. That is, the on-board device performs a determination of whether the first portable device is inside the vehicle or outside the vehicle. If the first portable device is not outside the vehicle, the on-board device sends detection signals to the activated second portable device from the first through sixth LF transmitting antennas, and in the same manner performs position detection for the second portable device.

If the first portable device and the second portable device activated by the wake-up signal from the first LF transmitting antenna are not outside the vehicle, the on-board device next transmits a wake-up signal from the second LF transmitting antenna, and similarly transmits detection signals to the activated portable devices and, based on response signals from the activated portable devices, performs position detection for each portable device. In the example shown in FIG. 22, the third portable device has been activated through the wake-up signal transmitted from the second LF transmitting antenna, and the on-board device performs position detection for the third portable device.

Thereafter, in the same manner, wake-up signals are transmitted from the third through sixth LF transmitting antennas, detection signals are transmitted to the activated portable devices, and position detection is performed for the activated portable devices. The on-board device repeatedly performs the above processing until a portable device outside the vehicle is detected.

SUMMARY

Thus, in a conventional passive entry system, when there are a plurality of portable devices that are activated by a wake-up signal, transmitting and receiving of information necessary for position detection of a portable device is performed with the portable devices, separately for each activated portable device. Therefore, there was the problem that time was needed for communication of information necessary for door locking processing or unlocking processing.

To shorten the time needed for position detection, a method is also thought in which an on-board device simultaneously communicates with a plurality of portable devices and perform position detection. However, when signals are simultaneously transmitted from a plurality of portable devices, there are cases that the on-board device fails transmission. There was a concern that communication may become unstable.

This invention has been made in consideration of such circumstances, and has an object of providing an on-board communication system, and a portable device that constitutes the on-board communication system, in which it is possible to shorten the time needed for portable device position detection and to execute stable communication of information between the on-board device and the portable devices.

An on-board communication system related to this invention is provided with (i) an on-board device that transmits a detection signal from an antenna disposed in a vehicle and (ii) a plurality of portable devices that each receive the detection signal transmitted from the on-board device and transmit response signals corresponding to the received detection signal. The on-board device performs position detection of each of the portable devices by receiving the response signals transmitted from each of the portable devices. The detection signal is a signal received in common by the plurality of portable devices. The on-board communication device comprises (i) an on-board transmission unit that transmits the detection signal from the antenna and (ii) an on-board reception unit that receives the response signal transmitted from each of the portable devices. Each of the portable devices comprises (i) a portable reception unit that receives the detection signal transmitted from the on-board device, and (ii) a portable transmission unit that, when the portable reception unit receives the detection signal, transmits at a different timing (a) a first response signal that includes information corresponding to the received detection signal and (b) a second response signal including the same information as the information included in the first response signal.

In an on-board communication system related to this invention, the portable transmission unit of each of the plurality of portable devices transmits the second response signal at a point in time different from that of the other portable devices.

In an on-board communication system related to this invention, the on-board transmission unit is configured to transmit a timing start signal from the antenna. Each of the portable devices comprises a timer unit that measures an elapsed time after the portable reception unit receives the timing start signal, and when a specified time has elapsed after the portable reception unit has received the timing start signal, the portable transmission unit transmits the second response signal. The specified time is different for each of the plurality of portable devices.

In an on-board communication system related to this invention, prior to transmission of the detection signal, the on-board transmission unit transmits from the antenna a processing start signal for causing reception processing of the detection signal by each of the portable devices to start, and the processing start signal functions as the timing start signal, and the timer unit measures an elapsed time from when the portable reception unit receives the processing start signal.

In an on-board communication system related to this invention, the detection signal functions as the timing start signal, and the timer unit measures an elapsed time from when the portable reception unit receives the detection signals.

In an on-board communication system related to this invention, the portable transmission unit transmits the first response signal when elapse of a first specified time has been measured by the timer unit, and transmits the second response signal when elapse of a second specified time has been measured by the timer unit. The second specified time is different for each portable device.

In an on-board communication system related to this invention, the portable device is provided with a detection unit that detects a received signal strength of the detection signal received by the portable reception unit. The portable transmission unit transmits (i) a first response signal that includes information regarding the received signal strength detected by the detection unit and (ii) a second response signal. The on-board device specifies a position of the portable device, based on the received signal strength included in the first or second response signal.

In an on-board communication system related to this invention, the portable device is provided with a detection unit that detects a received signal strength of the detection signal received by the portable reception unit and specifies a position of the portable device, based on the received signal strength detected by the detection unit, and the portable transmission unit transmits a first response signal and a second response signal that include specified position information.

An on-board device related to this invention is an on-board device that detects a position of each of the portable devices by (i) transmitting detection signals from antennas disposed in a vehicle and (ii) receiving the first and second response signals that are transmitted at a different timing corresponding to each the detection signals from each of the plurality of portable devices outside. The detection signals are signals in which the plurality of portable devices receives in common. The on-board device comprises (i) a portable transmission unit that transmits the detection signals from the antennas disposed in the vehicle, and (ii) a portable reception unit that receives the first or second response signal transmitted from each of the portable devices.

A portable device related to this invention is provided with (i) an on-board device that transmits a detection signal from an antenna disposed in a vehicle and (ii) a plurality of portable devices that receive the detection signal transmitted from the on-board device and each transmit response signals corresponding to the received detection signal. The on-board device performs position detection of each of the portable devices by receiving the response signals transmitted from each of the portable devices. The portable device comprises (i) a portable reception unit that receives the detection signal transmitted from the on-board device, and (ii) a portable transmission unit that, when the portable reception unit receives the detection signal, transmits at a different timing (i) a first response signal that includes information corresponding to the received detection signal and (ii) a second response signal including the same information as the information included in the first response signal.

In a portable device related to this invention, the second response signal is transmitted at a point in time different from that of the other portable devices.

A portable device related to this invention is further provided with a timer unit that measures an elapsed time from when the portable reception unit receives a timing start signal transmitted from the on-board device. The portable transmission unit transmits the second response signal after a specified time has elapsed after the portable reception unit receives the timing start signal. The specified time is different for each of the plurality of portable devices.

In a portable device related to this invention, the portable reception unit is configured to receive, prior to transmission of the detection signal, a processing start signal transmitted from the on-board device in order to start a reception processing of the detection signal, and the processing start signal functions as the timing start signal, and the timer unit measures an elapsed time from when the portable reception unit receives the processing start signal.

In a portable device related to this invention, the detection signal functions as the timing start signal, and the timer unit measures an elapsed time from when the portable reception unit receives the timing start signal.

In a portable device related to this invention, the portable transmission unit transmits the first response signal when elapse of the first specified time has been measured by the timer unit, and transmits the second response signal when elapse of the second specified time has been measured by the timer unit. The second specified time is different for each portable device.

In this invention, the on-board transmission unit transmits from an antenna disposed in a vehicle the detection signal for detecting a position of each of the portable devices. The detection signal is a signal received in common by a plurality of portable devices, and is not a signal that is transmitted to a particular portable device.

The portable device transmits to the on-board device (i) a first response signal that includes information corresponding to the received detection signal and (ii) a second response signal that includes the same information as the information included in the first response signal. When there is a plurality of portable devices, there is a possibility that first response signals will be transmitted simultaneously from the plurality of portable devices, and that the on-board device will fail to receive the first response signals. However, because the portable devices transmit the second response signals that include the same information as the information included in the first response signals, even if the on-board device fails to receive the first response signals, it can receive the second response signals, and position detection of the portable devices can be performed through the second response signals.

Furthermore, the first and second response signals do not necessarily have to be exactly identical. As long as common information is included in part of information included in the first and second response signals, it is sufficient. For example, if the first response signal includes (i) information related to position detection and (ii) information showing that it is the first response signal, and the second response signal includes (i) information related to the position detection and (ii) information showing that it is the second response signal, this is also included in this invention.

Additionally, the same information included in the first and second response signals can be substantially the same, or can be different information in appearance. For example, even if, in units, numerical values showing information included in the first response signals are different from numerical values showing information included in the second response signals, or they are information in a different format, if the information is substantially the same, a system that transmits and receives the first response signal and the second response signal is included in this invention.

In this invention, a plurality of portable devices transmits the first response signals and then the second response signals at points in time different from each other. Thus, when there is a portable device present within a reception range of the detection signal transmitted from the on-board device, regardless of which portable device it is, the on-board device receives the first response signal and executes a prescribed processing corresponding to the first response signal. Because the first response signals are signals that are transmitted from the portable device earlier than the second response signals, the on-board device can receive the first response signals early and execute a prescribed processing. If there are a plurality of portable devices within a reception range of the detection signal transmitted from the on-board device, there is a possibility that the on-board device will fail to receive the first response signals. However, each portable device transmits the second response signals at different points in time. Thus, the on-board device can reliably receive the second response signals and execute a prescribed processing corresponding to the second response signals.

Additionally, it is preferable that the first response signals are simultaneously transmitted from each portable device, but it is not necessarily the case that the structure needs to be such the first response signals need to be simultaneously transmitted. For example, a plurality of portable devices can transmit the first response signals upon completion of execution of a prescribed processing that is performed by receiving the detection signal. In this case, there is a possibility that the first response signals are transmitted from a plurality of portable devices at the same timing, but the plurality of portable devices further transmits the second response signals to the on-board device. Thus, the on-board device can receive either the first response signals or the second response signals.

In this invention, the on-board device transmits a timing start signal. The portable devices receive the timing start signal and transmit the second response signals according to a time elapsed after the timing start signal is received. That is, each portable device transmits the second response signal using, as a reference, the time at which the timing start signal transmitted from the on-board device was received. Thus, the timings at which the second response signals are transmitted from each portable device can be reliably made different. Therefore, the on-board device can reliably receive the second response signals and execute a prescribed processing corresponding to the second response signals.

In this invention, prior to transmission of the detection signal for determining a position of the portable device, the on-board device transmits a processing start signal for causing reception processing of the detection signal by the portable device to start. The portable device receives a processing start signal and transmits the second response signals corresponding to elapse time after the processing start signal is received. That is, each portable device transmits the second response signal, using, as a reference, the time at which the processing start signal transmitted from the on-board device is received. Thus, the timing when the second response signals are transmitted from each portable device can be reliably made different. Therefore, the on-board device can reliably receive the second response signals and execute a prescribed processing corresponding to the second response signals.

Furthermore, the processing start signal is an example of the timing start signal for measuring the timing at which the portable devices transmit the first and second response signals. That is, here, the processing start signal is used in common as the timing start signal.

In this invention, the portable devices receive the detection signal and transmit the second response signals corresponding to the elapsed time after the detection signal is received. That is, each portable device transmits the second response signal using, as a reference, the time at which the detection signal transmitted from the on-board device was received. Thus, the timing at which the second response signals are transmitted from each portable device can be reliably made different. Therefore, the on-board device can reliably receive the second response signals and execute a prescribed processing corresponding to the second response signals.

Furthermore, the detection signal is an example of the timing start signal for measuring the timing at which the portable device transmits the first and second response signals. That is, here, the detection signal is used in common as the timing start signal.

In this invention, the on-board device receives the first and second response signals corresponding to elapsed time measured by the timer unit. Specifically, each portable device transmits (i) the first response signal when the first specified time elapses and (ii) the second response signal when the second specified time elapses. Thus, the on-board device can promptly receive the first response signals, and reliably receive the second response signals and execute a prescribed processing corresponding to the second response signals even if it fails to receive the first response signals.

By matching the timing at which the first response signals are transmitted from the plurality of portable devices, even if the transmission timing of the signals transmitted from the plurality of portable devices is slightly shifted, interference of the first and second response signals due to a transmission period of the first response signal transmitted from one portable device overlapping a transmission period of the second response signal transmitted from another portable device can be avoided.

Furthermore, in case of a structure in which the timing at which the first response signals are transmitted from the plurality of portable devices is not matched, in order to avoid interference of the first and second response signals, the transmission timing of the first response signals and the transmission timing of the second response signals need to be made sufficiently distant from each other. In this case, there is a possibility that responsiveness of the on-board communication system becomes poor. However, this invention is provided with a structure in which the first response signals are simultaneously transmitted from a plurality of portable devices, so even if the transmission timing of the second response signals and the transmission timing of the first response signals are made to be close, there is no problem, and responsiveness of the on-board communication system can be improved.

In this invention, a portable device detects a received signal strength of a detection signal transmitted from the on-board device and transmits the first response signal and the second response signal that include information regarding the received signal strength that has been detected. The received signal strength of the detection signal detected by the portable device changes, depending on the position of the portable device with respect to the on-board device. Thus, depending on the received signal strength of the detection signal, the position of the portable device can be identified. The on-board device can execute a prescribed processing related to position detection of the portable device, using information regarding the received signal strength. That is, through the response signals transmitted from the portable device, the on-board device detects the position of the portable device.

In this invention, a portable device detects a received signal strength of the detection signal transmitted from the antenna. The received signal strength of each detection signal detected by the portable device changes, depending on the position of the portable device with respect to the on-board device. Thus, depending on the received signal strength of the detection signal, the position of the portable device can be identified. The portable device identifies the position of the portable device based on the received signal strength that has been detected, and transmits to the on-board device the first response signal and the second response signal including the identified position information. The on-board device detects the position of the portable device by receiving the first response signal and the second response signal including the identified portable device position information.

According to this invention, it is possible to shorten the time needed for position detection of a portable device and execute stable communication of information between an on-board device and portable devices.

BRIEF DESCRIPTION OF THE DRAWINGS

FIG. 10 is an explanatory diagram showing a fifth example of processing related to vehicle door locking or unlocking.

FIG. 16 is an explanatory diagram showing a fourth example of processing related to engine starting.

DETAILED DESCRIPTION OF EMBODIMENTS

Below, this invention is described in detail with reference to the drawings showing the embodiments.

First Embodiment

<Structure of On-Board Communication System>

Figure 1:
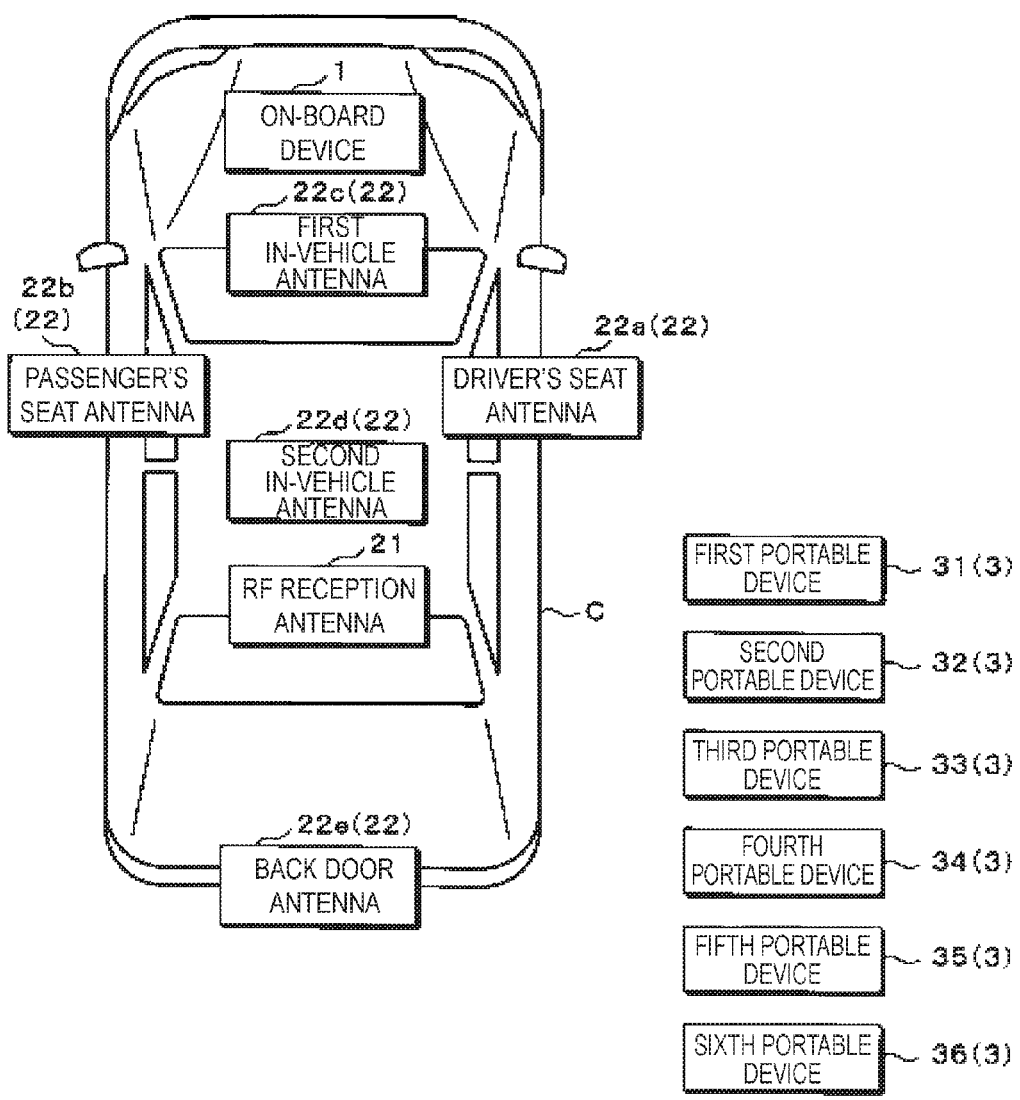
FIG. 1 is a schematic diagram showing a structural example of an on-board communication system.

FIG. 1 is a schematic diagram showing a structural example of an on-board communication system. The on-board communication system according to this embodiment comprises an on-board device 1 that sends and receives various types of signals using a plurality of LF transmission antennas 22 and an RF reception antenna 21 disposed in a vehicle C, and a plurality of portable devices 3 that send signals to and receive signals from the on-board device 1. The on-board device 1 performs position detection of the portable devices 3, and executes prescribed processing using the results of position detection of the portable devices 3, such as vehicle door locking processing or unlocking processing or the like. In this embodiment, position detection refers to a vehicle inside/outside determination that determines whether a portable device 3 is inside the vehicle or outside the vehicle. However, the meaning of position detection in this invention is not necessarily limited to this.

The plurality of LF transmission antennas 22 is, for example, a driver's seat antenna 22a, a passenger's seat antenna 22b, a first in-vehicle antenna 22c, a second in-vehicle antenna 22d, a back door antenna 22e, and the like, and each of the LF transmission antennas 22 transmits signals using radio waves in the LF band. The LF band is one example of a radio wave band for transmitting signals, but the band is not limited to this. The driver's seat antenna 22a and the passenger's seat antenna 22b are respectively arranged at the pillar on the driver's seat side and at the pillar on the passenger's seat side. The first in-vehicle antenna 22c is disposed at the front of the vehicle C, and the second in-vehicle antenna 22d is arranged at the center of the vehicle C. The back door antenna 22e is arranged at the back door of the vehicle C.

The first in-vehicle antenna 22c and the second in-vehicle antenna 22d are for performing position detection of portable devices 3 inside the vehicle, by transmitting various types of signals primarily to the portable devices 3 that are inside the vehicle. The first in-vehicle antenna 22c and the second in-vehicle antenna 22d each transmit various types of signals primarily to in-vehicle areas near the respective various antennas. More specifically, the first in-vehicle antenna 22c and the second in-vehicle antenna 22d function as in-vehicle antennas that transmit processing start signals for causing processing for detecting positions of the portable devices 3 to start, primarily for portable devices 3 inside the vehicle. Detection signals for detecting positions of the portable devices 3 have a structure for transmitting from basically all of the LF transmission antennas 22, and even when detecting positions of the portable devices 3 outside the vehicle, the first in-vehicle antenna 22c and the second in-vehicle antenna 22d function as antennas that transmit detection signals to the portable devices 3.

The reason two in-vehicle antennas, that is to say the first in-vehicle antenna 22c and the second in-vehicle antenna 22d, are provided is because one LF transmission antenna 22 cannot cover the entire in-vehicle area, or in other words, the portable devices 3 cannot receive the various signals transmitted from one LF transmission antenna 22 in the entire area inside the vehicle.

Meanwhile, the driver's seat antenna 22a, the passenger's seat antenna 22b and the back door antenna 22e primarily transmit various signals to the portable devices 3 outside the vehicle, and thereby perform position detection of the portable devices 3 outside the vehicle. The driver's seat antenna 22a, the passenger's seat antenna 22b, and the back door antenna 22e respectively transmit various signals primarily to areas outside the vehicle near each of the antennas. More specifically, the driver's seat antenna 22a, the passenger's seat antenna 22b, and the back door antenna 22e function as out-of-vehicle antennas that transmit processing start signals primarily to the portable devices 3 outside the vehicle. The detection signals for detecting the positions of the portable devices 3 have a structure for transmitting from basically all of the LF transmission antennas 22, and even when detecting the positions of the portable devices 3 inside the vehicle, the driver's seat antenna 22a, the passenger's seat antenna 22b, and the back door antenna 22e function as antennas for transmitting detection signals to the portable devices 3.

In the description below, an example is described in which position detection signals are transmitted from all of the LF transmission antennas 22, but a structure in which detection signals are transmitted from only a portion of the plurality of LF transmission antennas 22 depending on the circumstances is not excluded from the this invention.

In this first embodiment, the explanation will assume that six portable devices 3 exist, namely a first portable device 31, a second portable device 32, a third portable device 33, a fourth portable device 34, a fifth portable device 35 and a sixth portable device 36.

Figure 2:
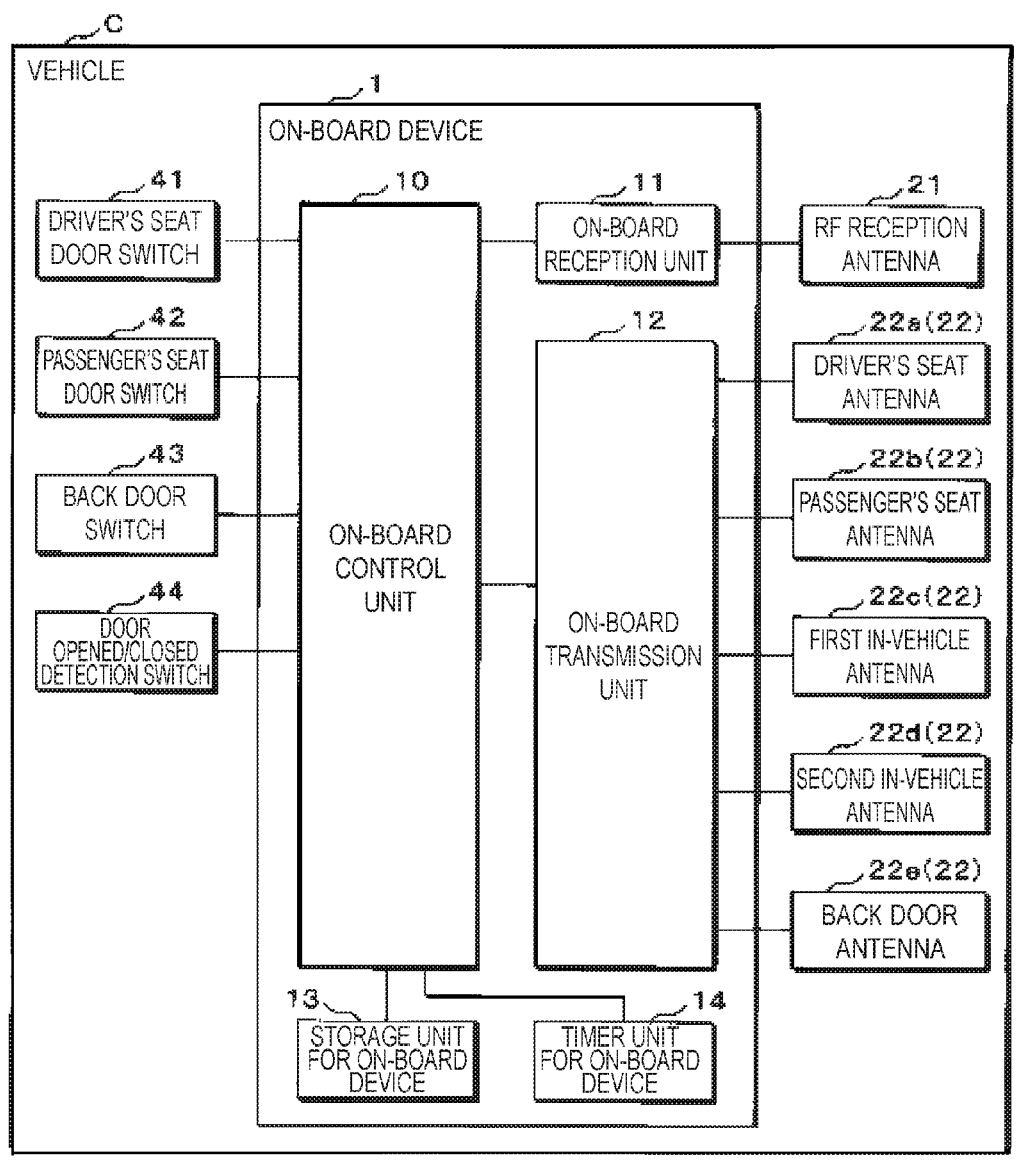
FIG. 2 is a block diagram showing a structural example of an on-board device.

FIG. 2 is a block diagram showing a structural example of an on-board device 1. The on-board device 1 comprises an on-board control unit 10 that controls the actions of the various constituent parts of the on-board device 1. The on-board control unit 10 is a microcomputer including, for example, one or a plurality of central processing units (CPUs), a multi-core CPU, or the like. The on-board control unit 10 is provided with an on-board reception unit 11, an on-board transmission unit 12, a storage unit for on-board device 13 and a timer unit for on-board device 14.

The on-board control unit 10 executes a below-described control program stored in the storage unit for on-board device 13, and thereby controls the actions of the various constituent parts, detects the positions of the portable devices 3 and executes prescribed processing in accordance with the results of position detection.

The storage unit for on-board device 13 is non-volatile memory such as electrically erasable programmable ROM (EEPROM), flash memory, or the like. The storage unit for on-board device 13 stores a control program with which the on-board control unit 10 controls the actions of the various constituent parts of the on-board device 1, and thereby accomplishes determinations of whether the portable devices 3 are inside or outside the vehicle and executes vehicle door locking processing or unlocking processing.

The on-board reception unit 11 is connected to the RF reception antenna 21, receives various signals such as response signals transmitted from the portable devices 3 using UHF-band radio waves, and outputs the received signals to the on-board control unit 10. Because the communicable area with UHF-band radio waves is broad, placement of the RF reception antenna 21 in the vehicle C is not particularly limited.

The on-board transmission unit 12 is connected to the plurality of LF transmission antennas 22, and transmits the detection signals for accomplishing vehicle inside/outside determination of the portable devices 3 under control by the on-board control unit 10. The strength of the detection signals transmitted from each of the LF transmission antennas 22 is set such that the portable devices 3 inside the vehicle or outside the vehicle can receive detection signals from two or more of the LF transmission antennas 22.

The timer unit for on-board device 14 starts timing under control by the on-board control unit 10, and provides the timing results to the on-board control unit 10. The timer unit for on-board device 14 is for accomplishing timeout processing or the like when there has been no response signal from a portable device 3 with regard to the detection signals transmitted from the on-board device 1.

A driver's seat door switch 41, a passenger's seat door switch 42, a back door switch 43 or the like are connected to the on-board control unit 10, and door signals corresponding to the operation state of the door switches are input to the on-board control unit 10. Below, any of the driver's seat door switch 41, the passenger's seat door switch 42 and the back door switch 43 is called "door switch" as needed. The on-board control unit 10 can recognize the operation state of the driver's seat door switch 41, the passenger's seat door switch 42 and the back door switch 43 on the basis of the door signals from each of the door switches. The driver's seat door switch 41 or the passenger's seat door switch 42 is a switch for unlocking or locking the vehicle door on the driver's side or the passenger's side, respectively, and is provided at the outside of the driver's seat or the outside of the passenger's seat. The back door switch 43 is a switch for locking or unlocking the back door that is one of the vehicle doors, and is provided at the outside of the back door. Each door switch is a push button. Instead of a push button, a contact sensor that detects contact by the user on the door handle may be provided. In addition, the on-board control unit 10 may directly acquire the door signal in response to operation of any of the door switches, or may acquire the door signal via a door electronic control unit (ECU), or other ECU, or the like.

In addition, a door opened/closed detection switch 44 that detects opening and closing of each vehicle door is connected to the on-board control unit 10. The door opened/closed detection switch 44 is a switch that is turned on and off according to opening and closing of a vehicle door, and is configured such that an opened/closed signal corresponding to the on/off state is input to the on-board control unit 10.

Figure 3:
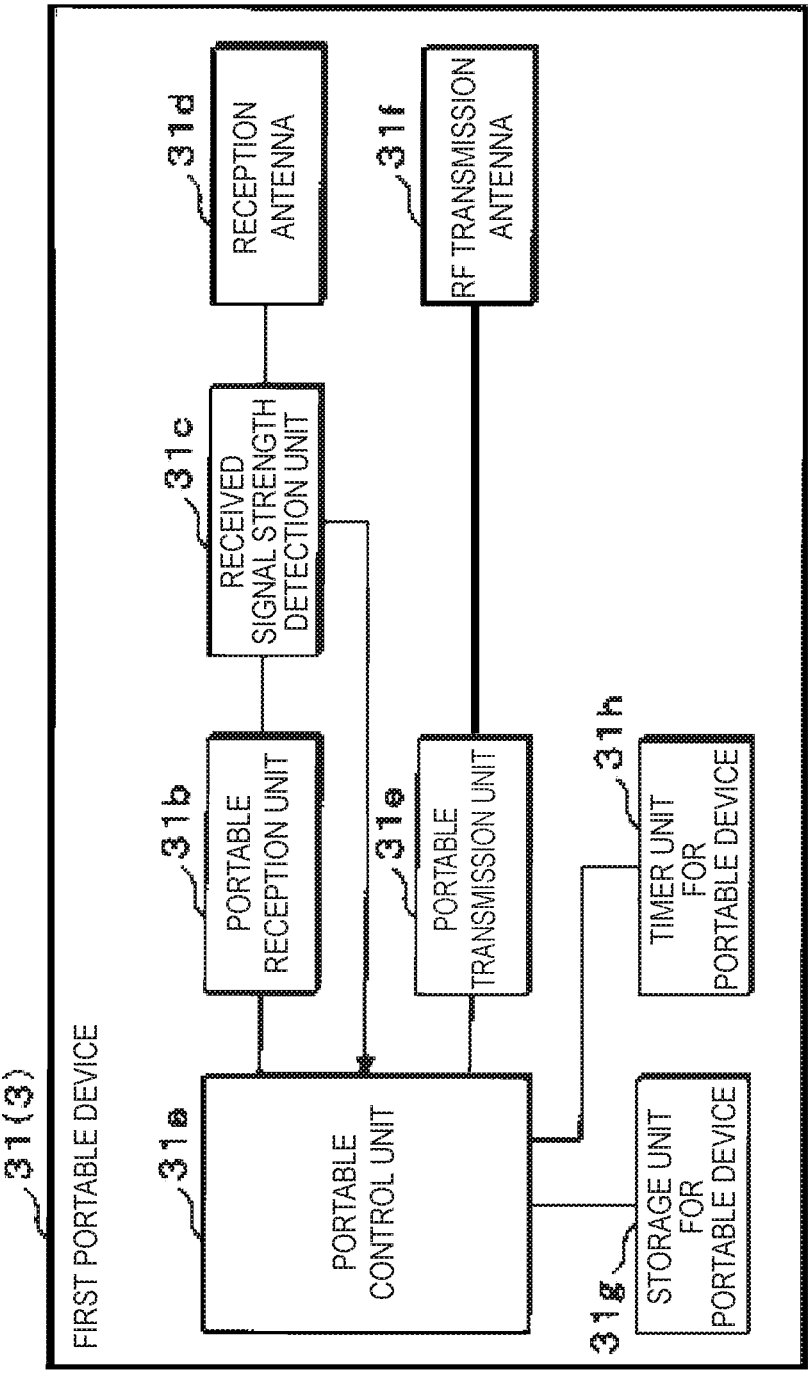
FIG. 3 is a block diagram showing a structural example of a portable device.

FIG. 3 is a block diagram showing a structural example of the portable device 3. The first through sixth portable devices 31, 32, . . . , 36 all have the same structure, so the structure of the first portable device 31 is described and a description of the structure of the other portable devices 3 is omitted. The portable device 3 is provided with a portable control unit 31a that controls the operations of the various constituent parts of the portable device 3. The portable control unit 31a is a microcomputer, for example, one or a plurality of CPUs, a multi-core CPU, or the like. The portable device 3 is provided with a portable reception unit 31b, a portable transmission unit 31e, a storage unit for portable device 31g and a timer unit for portable device 31h.

The portable control unit 31a reads a below-described control program stored in the storage unit for portable device 31g, controls the actions of the various constituent parts, and executes processing that transmits information necessary for the vehicle inside/outside determination of the portable device 3 to the on-board device 1.

The storage unit for portable device 31g is non-volatile memory the same as the storage unit for on-board device 13. The storage unit for portable device 31g stores a control program for executing processing that transmits to the on-board device 1 a response signal or the like including information for accomplishing the vehicle inside/outside determination of the portable device 3, by the portable control unit 31a controlling the operations of the various constituent parts of the portable device 3.

The portable reception unit 31b is connected to a reception antenna 31d via a received signal strength detection unit 31c, receives various signals transmitted from the on-board device 1 using LF-band radio waves, and outputs the signals to the portable control unit 31a. The reception antenna 31d is, for example, a triaxial antenna, and a fixed received signal strength is obtained regardless of the orientation or attitude of the portable device 3 with respect to the vehicle C.

The received signal strength detection unit 31c is a circuit that detects the received signal strengths of the detection signals received by the reception antenna 31d, and outputs the received signal strengths detected to the portable control unit 31a.

The portable transmission unit 31e is connected to an RF transmission antenna 31f, and transmits response signals corresponding to the detection signals transmitted from the on-board device 1, under control by the portable control unit 31a. The portable transmission unit 31e transmits the response signals using UHF-band radio waves. The UHF band is one example of the radio wave band for transmitting signals, and the band is not limited to this.

The timer unit for portable device 31h starts timing under control by the portable control unit 31a, and provides the timing results to the portable control unit 31a. The timer unit is for calculating the timing of sending response signals.

<Vehicle Door Locking Processing or Unlocking Processing>

Figure 4:
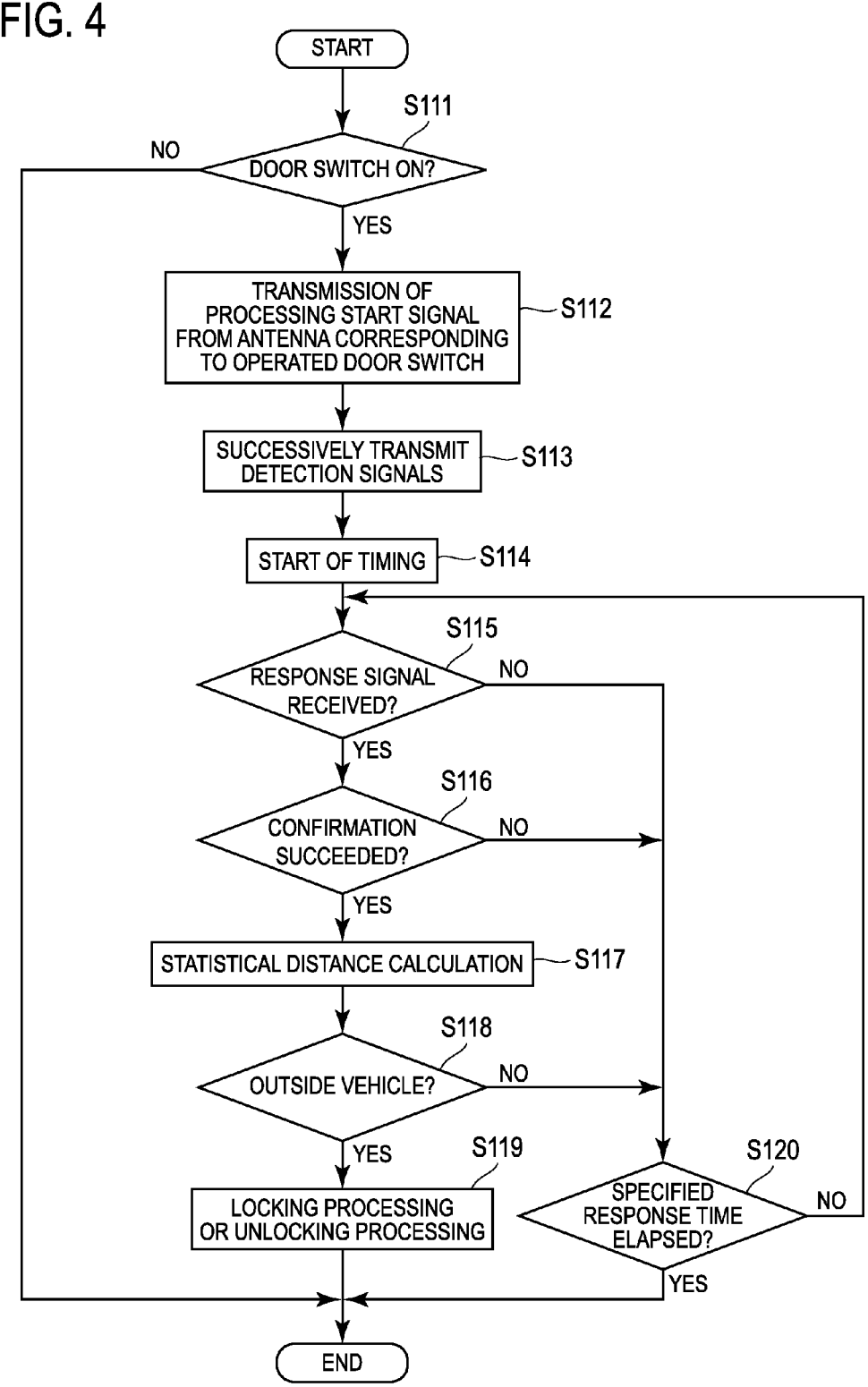
FIG. 4 is a flowchart showing a processing sequence of an on-board device, related to vehicle door locking or unlocking.
Figure 5:
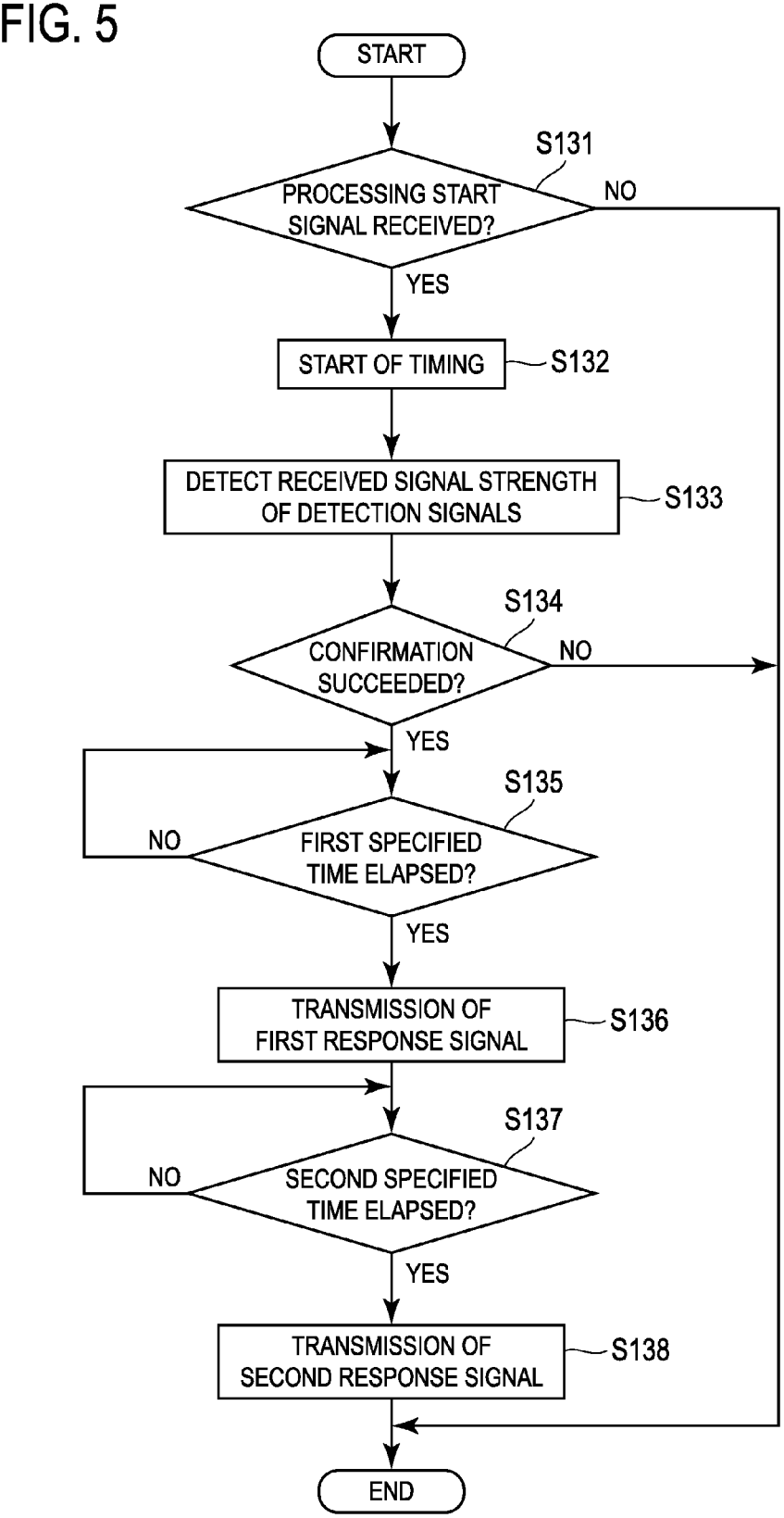
FIG. 5 is a flowchart showing a processing sequence of a portable device, related to vehicle door locking or unlocking.

FIG. 4 is a flowchart showing a processing sequence of an on-board device 1, related to vehicle door locking or unlocking. FIG. 5 is a flowchart showing a processing sequence of a portable device 3, related to vehicle door locking or unlocking. FIG. 6 is an explanatory diagram showing a first example of processing related to vehicle door locking or unlocking. Below, a process executed by the on-board control unit 10 of the on-board device 1, and a process executed by the portable control unit 31a of the portable device 3, will be described in sequence.

Figure 6A:
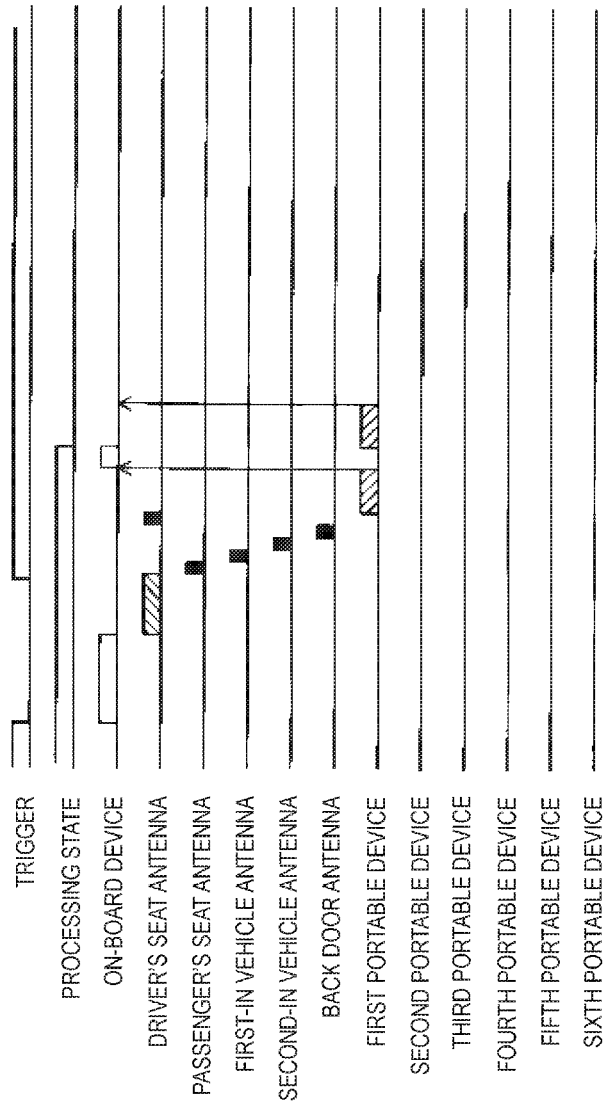
FIG. 6 is an explanatory diagram showing a first example of processing related to vehicle door locking or unlocking.

In FIG. 6A, "trigger" is a timing chart showing a trigger signal that starts a vehicle inside/outside determination of the portable device 3 related to this first embodiment. A trigger signal that is input and output to the on-board device 1 is shown by a bold line. The signal level of the trigger signal of this embodiment changes according to the operation state of the door switch. A high-level trigger signal corresponds to a state in which the door switch is not depressed, and a low-level trigger signal corresponds to a state in which the door switch is depressed. In particular, the "trigger" in FIG. 6A shows the operation state of the driver's seat door switch 41. The on-board device 1 starts processing of the vehicle inside/outside determination at the time at which the trigger signal falls from the high level to the low level.

In FIG. 6A, "processing state" is a timing chart showing a vehicle door locking or unlocking state. The vehicle door locking or unlocking state is shown by the vertical height indicated by the bold line. The state in which the bold line is positioned at the top corresponds to the locking state, and the state in which the bold line is positioned at the bottom corresponds to the unlocking state.

In FIG. 6A, "on-board device" is a timing chart showing the processing execution state of the on-board control unit 10 provided in the on-board device 1. The white rectangular portions indicate time periods in which the on-board control unit 10 executes some kind of processing. The on-board device 1 starts inside/outside determination processing with the fall of the trigger signal as the trigger, and gives to the on-board transmission unit 12 a command that causes transmission of various types of signals from the respective LF transmission antennas 22.

In FIG. 6A, "driver's seat antenna", "passenger's seat antenna", "first in-vehicle antenna", "second in-vehicle antenna" and "back door antenna" are timing charts showing the timing at which signals are transmitted from the various LF transmission antennas 22. The rectangular portions with hatching downward to the left indicate the timing at which processing start signals are transmitted from the driver's seat antenna 22a, the passenger's seat antenna 22b, the first in-vehicle antenna 22c, the second in-vehicle antenna 22d, and the back door antenna 22e. In the example shown in FIG. 6A, the driver's seat door switch 41 is depressed and a processing start signal is transmitted from the driver's seat antenna 22a. The processing start signal is a signal for causing the start of processing for detecting the positions of the first through sixth portable devices 31, 32, . . . , 36.

In addition, the black rectangular portions indicate the timing at which detection signals for accomplishing a vehicle inside/outside determination of the portable device 3 are transmitted.

In FIG. 6A, "first portable device" to "sixth portable device" are timing charts indicating the timing at which the first portable device 31 through the sixth portable device 36 transmit response signals. The rectangular portions with hatching downward to the right indicate response signals transmitted from the first portable device 31 through the sixth portable device 36. In the example shown in FIG. 6A, only the first portable device 31 is present, and response signals are transmitted from the first portable device 31. The response signals are signals including information for detecting the positions of the portable devices 3.

The correlation between the various types of signals and the patterns of the rectangular portions of the timing charts in FIG. 6A described above are the same in other drawings showing timing charts.

The processing sequence of the on-board control unit 10 will be described with reference to FIG. 4. The on-board control unit 10 of the on-board device 1 monitors the operation state of the driver's seat door switch 41, the passenger's seat door switch 42, the back door switch 43, or the like and determines whether a door switch is in an on state (step S111). The on state is the state in which the door switch is depressed, and the off state is the state in which the door switch is not depressed. In FIG. 6A, a high-level trigger signal indicated by "trigger" corresponds to the state in which the door switch is not depressed, and a low-level trigger signal corresponds to the state in which the door switch is depressed. The on-board control unit 10 can recognize the operation state of the door switch based on the signal level of the trigger signal. When it is determined that the door switch is in an off state (step S111: No), the on-board control unit 10 ends processing. When it is determined that the door switch is in an on state (step S111: Yes), the on-board control unit 10 controls the operation of the on-board transmission unit 12 such that a processing start signal is transmitted from the LF transmission antenna 22 that corresponds to the operated door switch, using LF-band radio waves (step S112).

The processing start signals are one example of a timing start signal for starting time measurement by the timer unit for portable device 31h in order to device the timing at which the portable device 3 transmits the first response signal and the second response signal. That is, in this first embodiment, a processing start signal is used in common as a timing start signal.

The on-board controller 10 may control the operation of the on-board transmission unit 12 such that timing start signals are transmitted as signals different from the processing start signals. For example, the structure may be such that the on-board device 1 transmits processing start signals, and then transmits timing start signals. Additionally, if the processing start signals and the timing start signals are transmitted as separate signals, the on-board device 1 may transmit the processing start signals and the timing start signals from the same LF transmission antennas 22. Because the processing start signals are transmitted from the LF transmissions antennas, from which it is easy for the portable devices 3 to receive the processing start signals, the portable devices 3 can be enabled to reliably receive the timing start signals by also transmitting the timing start signals from the same LF transmission antennas 22.

Next, the on-board control unit 10, without waiting for a response from the portable device 3 and following transmission of a processing start signal, controls the operations of the on-board transmission unit 12 such that detection signals having a prescribed signal strength, for detecting the position of the portable device 3, are transmitted successively, using LF-band radio waves, from the passenger's seat antenna 22b, the first in-vehicle antenna 22c, the second in-vehicle antenna 22d, the back door antenna 22e, the driver's seat antenna 22a and at different timing for each of the plurality of LF transmission antennas 22 (step S113).

The processing operations of step S111 through step S113 will be described with reference to FIG. 6A. As shown in FIG. 6A, the on-board control unit 10 controls the operation of the on-board transmission unit 12 by executing the processing indicated in step S112 in response to pressing of the door switch. That is, the on-board control unit 10 starts the processing of the vehicle inside/outside determination with the fall of the trigger signal as a trigger, and gives a control command to the on-board transmission unit 12.

In FIG. 6A, the white rectangular portion shown in the "on-board device" timing chart indicates a portion of the primary processing of the vehicle inside/outside determination, that is, the timing at which the on-board control unit 10 executes the processing of step S112 and step S113.

The on-board transmission unit 12 performs transmission of the processing start signal and the detection signals from the transmission antennas 22, under control by the on-board control unit 10. In the first embodiment shown in FIG. 6A, a case is shown in which the driver's seat door switch 41 is operated. In this case, the on-board transmission unit 12 transmits a processing start signal (the rectangular portion with hatching downward to the left) from the driver's seat antenna 22a. The processing start signal is a signal for causing processing for detecting the position of the portable device 3 to start. For example, the processing start signal includes information for causing a portable device 3 in a sleep state to wake up, information necessary for confirmation of the on-board device 1 in the portable device 3, and the like. In addition, the processing start signal includes information required for a vehicle inside/outside determination of the portable device 3. For example, the processing start signal includes request information such as information for confirming the legitimacy of the on-board device 1 that is the transmission source of the processing start signal, and information necessary for performing the vehicle inside/outside determination of the portable device 3.

For example, if the passenger's seat door switch 42 is operated, the on-board transmission unit 12 transmits the processing start signal from the passenger's seat antenna 22b. If the back door switch 43 is operated, the on-board transmission unit 12 transmits the processing start signal from the back door antenna 22e. That is, the processing start signal is transmitted from the LF transmission antenna 22 that is close to the operated door switch.

Next, the on-board transmission unit 12 transmits detection signals (the black-shaded rectangular portions) successively from the plurality of LF transmission antennas 22, at a different timing for each of the plurality of LF transmission antennas 22. The detection signals are signals used in the vehicle inside/outside determination of the portable device 3. The timing of transmitting signals from each of the LF transmission antennas 22 is determined in advance. For example, the on-board device 1 makes the transmission time of the processing start signal a reference time and causes signals to be transmitted from each of the LF transmission antennas 22 at a predetermined timing that differs for each of the LF transmission antennas 22.

In this embodiment, one characteristic is that the LF transmission antenna 22 that sent the processing start signal (here, the driver's seat antenna 22a) transmits the detection signal last. When the processing start signal is transmitted from one LF transmission antenna 22 and immediately thereafter the detection signal is transmitted from the same LF transmission antenna 22, a burden is imposed on the LF transmission antenna 22. However, by having a structure such that when the processing start signal is transmitted from one LF transmission antenna 22, the detection signal is transmitted from other LF transmission antennas 22 and lastly the detection signal is transmitted from the one LF transmission antenna 22, it is possible to avoid the burden of signal transmission being concentrated on the one LF transmission antenna 22.

However, in the this invention, the order of the plurality of LF transmission antennas 22 transmitting the detection signal is not particularly limited as described above, and it is possible to set an arbitrary order.

Returning to FIG. 4, the processing sequence of the on-board control unit 10 will be described. The on-board control unit 10 that has finished the processing in step S113 starts timing a standby time waiting for a response from the portable device 3, that is, a timeout time, through the timer unit for on-board device 14 (step S114). The timing at which the timing is started by the timer unit for on-board device 14 is not particularly limited as long as it is possible to execute the timeout process. For example, timing may start from the point in time at which the door switch is placed in an on state, or from the point in time at which transmission of the processing start signal starts or ends.

Next, the on-board control unit 10 determines whether or not the on-board reception unit 11 has received a response signal transmitted from any one of the portable devices 3 out of the first through sixth portable devices 31, 32, . . . , 36 (step S115). As described below, a portable device 3 that has received the processing start signal receives detection signals transmitted from each of the LF transmission antennas 22 and detects the received signal strengths of each of the detection signals received. The portable device 3 stores in advance the timing at which the detection signals are to be transmitted from each of the LF transmission antennas 22, and thus can specify the received signal strengths of the detection signals transmitted from each of the LF transmission antennas 22 by detecting the received signal strengths of the detection signals received by the reception antenna 31d at the prescribed timing. Furthermore, the portable device 3 confirms the on-board device 1 that is the transmission source of the processing start signal, and when confirmation is successful, transmits to the on-board device 1 a response signal including information on the received signal strengths detected, information for confirming the portable device 3 on the on-board device 1 side, and the like. The response signal is transmitted twice from the portable device 3, as shown in FIG. 6A. The rectangular portions with downward-right hatching indicate response signals transmitted from the portable device 3. In the example shown in FIG. 6A, a case is shown in which response signals are transmitted from the first portable device alone. The response signal transmitted the first time is the first response signal, and the response signal transmitted the second time is the second response signal.

In addition, the response signals in some cases are transmitted from all of the first through sixth portable devices 31, 32, . . . , 36, and in some cases are transmitted from a part of the portable devices 3 out of the first through sixth portable devices 31, 32, . . . , 36, depending on the position at which the first through sixth portable devices 31, 32, . . . , 36 exist. However, because each of the portable devices 3 transmits response signals using radio waves in the same frequency band, when response signals are simultaneously transmitted from two or more of the portable devices 3, there are cases in which the on-board device 1 cannot receive the response signals normally. Accordingly, in step S115, the on-board control unit 10 determines whether or not response signals transmitted from the portable devices 3 were received normally.

When it is determined that a response signal transmitted from a portable device 3 was received (step S115: Yes), the on-board control unit 10 confirms the portable device 3 based on the information contained in the response signal and determines whether or not confirmation was successful (step S116). When it is determined that confirmation was successful (step S116: Yes), the on-board control unit 10 calculates the statistical distance between (i) the portable device 3 that is the transmission source of the response signal and (ii) the inside of the vehicle and the outside of the vehicle, based on the information on the received signal strengths included in the response signal received (step S117).

The received signal strengths included in the response signal are a vector. The components of the vector are the respective received signal strengths of the plurality of detection signals transmitted from each of the LF transmission antennas 22. In this first embodiment, the vector is five-dimensional, because the vector has as components the received signal strengths respectively corresponding to the plurality of detection signals transmitted from the five LF transmission antennas 22. The storage unit for on-board device 13 of the on-board device 1 stores, for example, the statistical value of the average vector, a variance matrix or an inverse variance matrix, or the like of the received signal strengths found on the basis of a sample group of the received signal strengths detected by the portable device 3 at a plurality of locations inside the vehicle. The on-board control unit 10 calculates the statistical distance between (i) the sample group of received signal strengths detected by the portable device 3 that is inside the vehicle and (ii) the vector of the received signal strengths included in the response signal received in step S115. In other words, a value corresponding to the degree of similarity between (i) the received signal strengths included in the response signal received in step S115 and (ii) the received signal strengths detected by a portable device 3 disposed inside the vehicle is calculated. The statistical distance is, for example, a Mahalanobis distance, but is not particularly limited.

Similarly, the storage unit for on-board device 13 of the on-board device 1 stores the statistical values of the average vector, a variance matrix or an inverse variance matrix, or the like of the received signal strengths found on the basis of a sample group of the received signal strengths detected by the portable device 3 at a plurality of locations outside the vehicle. The on-board control unit 10 calculates the statistical distance between (i) the sample group of received signal strengths detected by a portable device 3 that is outside the vehicle and (ii) the vector of the received signal strengths included in the response signal received in step S115.

The on-board control unit 10 that has finished the processing of step S117 determines whether or not the portable device 3 that is the transmission source of the response signal received in step S115 is outside the vehicle, based on the statistical distance calculated in step S117 (step S118). That is, the on-board control unit 10 specifies the position of the portable device 3 through the processing of step S117 and step S118. The on-board control unit 10 determines that the portable device 3 is outside the vehicle if the statistical distance between the received signal strengths included in the response signal and the sample group of received signal strengths detected by a portable device 3 that is outside the vehicle is shorter than the statistical distance between the received signal strengths and the sample group of received signal strengths detected by a portable device 3 that is inside the vehicle. When it is determined that the portable device 3 is outside the vehicle (step S118: Yes), the on-board control unit 10 executes vehicle door locking processing or unlocking processing (step S119) and ends processing. If the door switch is operated in a vehicle door unlocking state, the on-board control unit 10 executes vehicle door locking processing. If the door switch is operated in a vehicle door locking state, the on-board control unit 10 executes vehicle door unlocking processing. More specifically, the on-board control unit 10 of the on-board device 1 executes processing to transmit to an undepicted door ECU a signal ordering door locking or unlocking.

In this embodiment, when it is determined that even one of the portable devices 3 is outside the vehicle, the on-board control unit 10 executes vehicle door locking processing or unlocking processing, without waiting for response signals from the other portable devices 3.

When it is determined in step S115 that a response signal has not been received (step S115: No), when it is determined in step S116 that confirmation has failed (step S116: No), or when it is determined in step S118 that a portable device 3 is inside the vehicle (step S118: No), the on-board control unit 10 determines whether or not a prescribed response time has elapsed since timing by the timer unit for on-board device 14 started (step S120). When the prescribed response time has not elapsed (step S120: No), the on-board control unit 10 returns processing to step S115 and executes the steps beginning with receiving response signals from the other portable devices 3 and continuing through the vehicle inside/outside determination. When it is determined that the prescribed response time has elapsed (step S120: Yes), the on-board control unit 10 ends processing.

The method of the vehicle inside/outside determination for portable devices 3 described above is one example, and it is possible to apply to the this invention an arbitrary method that enables accomplishment of a vehicle inside/outside determination for portable devices 3 on the basis of detection signals from the plurality of LF transmission antennas 22.

Next, processing by the portable devices 3 is described with reference to FIG. 5. Processing by the first through sixth portable devices 31, 32, . . . , 36 differs only in the transmission timing of response signals, so here, processing by the first portable device 31 is described. The portable control unit 31a of the portable device 3 monitors signals received by the portable reception unit 31b, and determines whether or not a processing start signal transmitted from the on-board device 1 has been received by the portable reception unit 31b (step S131). When it is determined that a processing start signal has not been received (step S131: No), the portable control unit 31a ends processing. When it is determined that a processing start signal has been received (step S131: Yes), the portable control unit 31a starts timing by the timer unit for portable device 31h (step S132).

In this first embodiment, the point in time at which the processing start signal is received is used as the timing of the start of time measurement by the timer unit for portable device 31h. However, if the structure is such that, as described above, a timing start signal is transmitted from the on-board device 1 separately from the processing start signal, the point in time at which the timing start signal is received can be used as the timing of the start of time measurement. Specifically, the structure may be such that the portable control unit 31a monitors the signals received by the portable reception unit 31b, and if it is determined that the portable reception unit 31b has received the timing start signal, the time measurement by the timer unit for portable device 31h starts.

Additionally, the structure may be such the portable control unit 31a monitors the signals received by the portable reception unit 31b, and if it is determined that the portable reception unit 31b has received a detection signal, the time measurement by the timer unit for portable device 31h starts. In this case, it is preferable for a detection signal transmitted from an LF transmission antenna 22 that is the same LF transmission antenna 22 that transmitted the processing start signal to be caused to function as the timing start signal. If a detection signal transmitted from an LF transmission antenna 22 that is different from the LF transmission antenna 22 that transmitted the processing start signal is used as the timing start signal, there is a possibility that a portable device 3 that has received the processing start signal will not be able to receive the detection signal that functions as the timing start signal. If the detection signal cannot be received, the portable device 3 cannot start time measurement. Because the processing start signal is transmitted from an LF transmission antenna 22, from which it basically is easy for the portable devices 3 to receive the processing start signal, by causing a detection signal transmitted from the LF transmission antenna 22 that is the same LF transmission antenna 22 that transmitted the processing start signal to function as the timing start signal, the possibility that a portable device 3 that has received the processing start signal can also receive the detection signal that functions as the timing start signal can be increased.

Next, the portable control unit 31a detects, in the received signal strength detection unit 31c, the received signal strengths of the detection signals transmitted from each of the LF transmission antennas 22 of the on-board device 1 (step S133). The timing at which the detection signals are transmitted from each of the LF transmission antennas 22 is predetermined. Accordingly, the portable control unit 31a can detect the received signal strengths of the detection signals transmitted from each of the LF transmission antennas 22, by acquiring the received signal strengths detected by the received signal strength detection unit 31c at the specific timing measured by the timer unit for portable device 31h. Furthermore, the portable control unit 31a confirms whether or not the transmission source of the processing start signal and the like is a legitimate on-board device 1, on the basis of information included in the processing start signal received earlier, and determines whether or not confirmation was successful (step S134). When it is determined that confirmation failed (step S134: No), the portable control unit 31a ends processing.

When it is determined that confirmation was successful (step S134; Yes), the portable control unit 31a determines whether or not a first prescribed time has elapsed from when the processing start signal was received (step S135). The first prescribed time is common among the first through sixth portable devices 31, 32, . . . , 36. When it is determined that the first prescribed time has not elapsed (step S135: No), the portable control unit 31a again executes the processing of step S135, and waits until the first prescribed time has elapsed. When it is determined that the first prescribed time has elapsed (step S135: Yes), the portable control unit 31a causes the portable transmission unit 31e to transmit the first response signal (step S136). The portable transmission unit 31e transmits the first response signal from the RF transmission antenna 31f using UHF-band radio waves. The first response signal includes information about the received signal strengths detected in step S133, information for confirming, on the on-board device 1 side, the legitimacy of the portable device 3 that is the transmission source of the information, and the like.

The other portable devices 3 besides the first portable device 31 also transmit the first response signal when roughly the same first prescribed time has elapsed. Accordingly, in a case such as when the user holds a plurality of portable devices 3, the first response signal is transmitted from the plurality of portable devices 3 at the same timing. Consequently, there are cases in which the on-board device 1 fails to receive the first response signal (see FIG. 11A). Hence, the portable control unit 31a executes the following processing.

The portable control unit 31a determines whether or not a second prescribed time has elapsed from when the processing start signal was received (step S137). The second prescribed time differs for each of the first through sixth portable devices 31, 32, . . . , 36. In this first embodiment, the description will assume that the second prescribed time becomes longer in the order of the first portable device 31, the second portable device 32, the third portable device 33, the fourth portable device 34, the fifth portable device 35 and the sixth portable device 36. The second prescribed time for each of the portable devices 3 is set such that the interval during which transmission and reception of the second response signal is accomplished between one of the portable devices 3 and the on-board device 1 does not overlap with the interval during which transmission and reception of the second response signal is accomplished between another of the portable devices 3 and the on-board device 1, and such that the sixth portable unit 36 can transmit the second response signal to the on-board device 1 as early as possible. When it is determined that the second prescribed time has not elapsed (step S137: No), the portable control unit 31a again executes the processing of step S137 and waits until the second prescribed time has elapsed. When it is determined that the second prescribed time has elapsed (step S137: Yes), the portable control unit 31a causes the portable transmission unit 31e to transmit the second response signal (step S138) and ends processing. The second response signal, like the first response signal, includes information about the received signal strengths detected in step S133, information for confirming the legitimacy of the portable device 3 that is the transmission source of the information, and the like.

The first response signal and the second response signal may contain substantially the same information relating to the received signal strengths, or the first and second response signals may include information that partially differs.

Figure 11A:
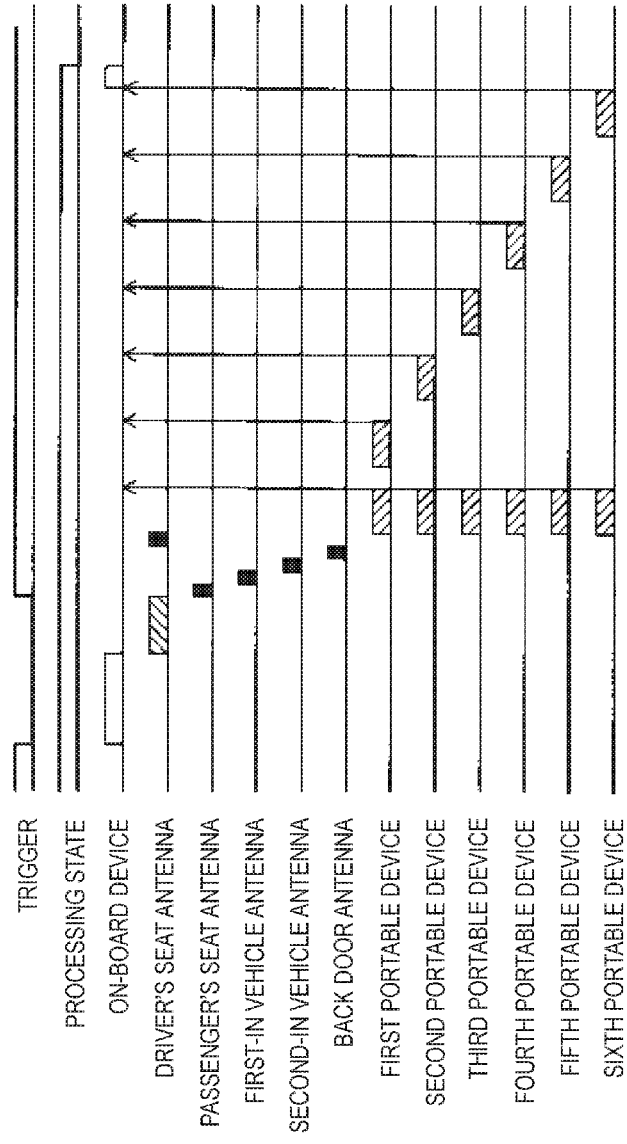
FIG. 11 is an explanatory diagram showing a sixth example of processing related to vehicle door locking or unlocking.

When the portable device 3 structured in this manner has received a processing start signal, the received signal strengths of the detection signals transmitted from each of the LF transmission antennas 22 are detected, the first response signals are transmitted at a common timing for each of the portable devices 3, and the second response signals are transmitted at different timing for each of the portable devices 3 (see FIG. 11A).

In the example described with reference to FIG. 4 and FIG. 5, an example was described in which the on-board control unit 10 executes a statistical distance calculation and a vehicle inside/outside determination for the portable devices 3, but the structure may be such that the primary processing of the statistical distance calculation and the vehicle inside/outside determination is executed by the portable device 3 and a response signal including the results of the vehicle inside/outside determination is transmitted to the on-board device 1. Specifically, as information for the vehicle inside/outside determination, the storage unit for portable device 31g stores (i) the statistical values of an average vector, a variance matrix or an inverse variance matrix, or the like of the received signal strengths found based on the sample group of received signal strengths detected by the portable device 3 at a plurality of locations inside the vehicle, and (ii) the statistical values of an average vector, a variance matrix or an inverse variance matrix, or the like of the received signal strengths found based on the sample group of received signal strengths detected by the portable device 3 at a plurality of locations outside the vehicle. The portable control unit 31a executes the same processing as in step S117 and step S118 after the received signal strengths of the detection signals transmitted from each of the LF transmission antennas 22 in step S133 are detected by the received signal strength detection unit 31c. That is, the portable control unit 31a calculates the statistical distances between (i) the inside of the vehicle and the outside of the vehicle and (ii) the portable device 3 itself, on the basis of the information about the received signal strengths. Furthermore, the portable control unit 31 a determines whether or not the unit itself is outside the vehicle, on the basis of the calculated statistical distances. That is, the portable control unit 31a determines its own position. The portable control unit 31*a* determines that the unit itself is outside the vehicle if the statistical distance between (i) the detected received signal strengths and (ii) the sample group of received signal strengths detected by a portable device 3 outside the vehicle is shorter than the statistical distance between (i) the detected received signal strengths and (ii) the sample group of received signal strengths detected by a portable device 3 inside the vehicle. Similarly, the portable control unit 31*a* determines that the unit itself is inside the vehicle when the statistical distance between (i) the detected received signal strengths and (ii) the sample group of received signal strengths detected by a portable device 3 inside the vehicle is short compared to the statistical distance between (i) the detected received signal strengths and (ii) the sample group of received signal strengths detected by a portable device 3 outside the vehicle. Below, the portable control unit 31*a* transmits the first response signal and the second response signal including the results of the vehicle inside/outside determination to the on-board device 1, through the portable transmission unit 31*e*, by executing the same processing as in step S134 through step S138 of FIG. 5.

The on-board control unit 10 receives the response signals transmitted from the portable device 3 via the on-board reception unit 11 (step S115: Yes), confirms the portable device 3 on the basis of the information included in the response signals, and determines whether or not confirmation was successful (step S116). When it is determined that confirmation was successful (step S116: Yes), the on-board control unit 10 determines whether or not the portable device 3 is inside the vehicle, on the basis of the results of the vehicle inside/outside determination included in the response signals (step S118). In the structure in which the portable device 3 accomplishes the vehicle inside/outside determination, the on-board control unit 10 does not execute the processing of step S117. When it is determined that the portable device 3 is outside the vehicle (step S118: Yes), the on-board control unit 10 executes vehicle door locking and unlocking processing (step S119), and ends processing.

When it is determined in step S115 that a response signal has not been received (step S115: No), when it is determined in step S116 that confirmation has failed (step S116: No), or when it is determined in step S118 that the portable device 3 is inside the vehicle (step S118: No), the on-board control unit 10 determines whether or not the prescribed response time has elapsed from when timing was started by the timer unit for on-board device 14 (step S120). When the prescribed response time has not elapsed (step S120: No), the on-board control unit 10 returns processing to step S115 and executes the steps beginning with receiving response signals from the other portable devices 3 and continuing through the vehicle inside/outside determination. When it is determined that the prescribed response time has elapsed (step S120: Yes), the on-board control unit 10 ends processing.

Next, operation of an on-board communication system structured as described above will be explained.

First Example

Figure 6B:
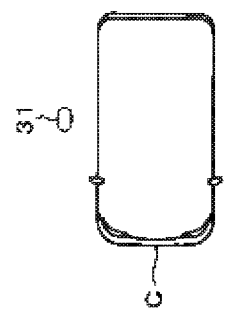

As shown in FIG. 6B, the first example is a case in which the first portable device 31 is outside the vehicle. When a user depresses the driver's seat door switch 41, as shown in FIG. 6A, the on-board device 1 transmits a processing start signal from driver's seat antenna 22*a*, and then successively transmits detection signals for the vehicle inside/outside determination from each LF transmission antenna 22, at a different timing for each of the plurality of LF transmission antennas 22. Because a user is holding the first portable device 31, the first portable device 31 receives the processing start signal, measures the received signal strengths of the signals transmitted from each LF transmission antenna 22, and transmits to the on-board device 1, in order, (i) a first response signal that has information of the measured received signal strengths and (ii) a second response signal. Because only the first portable device 31 exists inside the vehicle or near the outside of the vehicle, the on-board device 1 can normally receive the first response signal transmitted from the first portable device 31. Therefore, the on-board device 1 can perform vehicle inside/outside determination of the first portable device 31, based on the first response signal transmitted from the first portable device 31. In the first example, because the first portable device 31 is outside the vehicle, the on-board control unit 10 of the on-board device 1 can execute vehicle door locking processing or unlocking processing based on the first response signal that is first transmitted from the first portable device 31. In particular, as shown in FIG. 6A, if the driver's seat door switch 41 is depressed in a state in which the vehicle doors are locked, the vehicle doors are unlocked. Hereafter, this is the same in FIG. 7 to FIG. 11.

Second Example

Figure 7A:
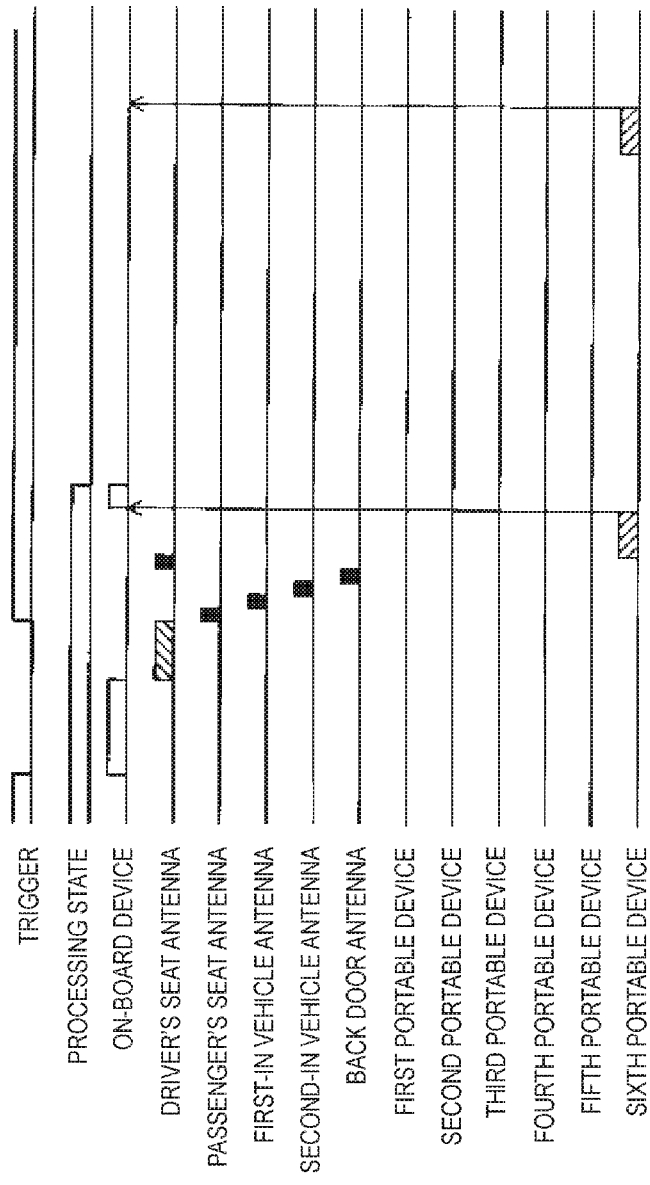
FIG. 7 is an explanatory diagram showing a second example of processing related to vehicle door locking or unlocking.
Figure 7B:
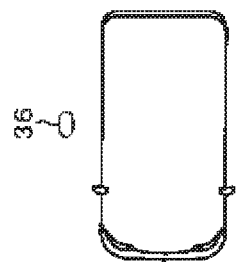

FIG. 7 is an explanatory diagram showing a second example of processing related to vehicle door locking or unlocking. The second example is a case in which the sixth portable device 36 is outside the vehicle, as shown in FIG. 7B. The sequence of transmitting and receiving the processing start signal and detection signals for the vehicle inside/outside determination is the same as in the first example.

When communication is accomplished separately with each of the portable devices as in the Background Technology section, the tendency is for communication with the sixth portable device 36 to occur last among the plurality of portable devices 3, so in cases such as this example in which only the sixth portable device 36 is present, time is required before the prescribed processing is executed. In contrast, with the present invention, detection signals that the plurality of portable devices 3 can receive in common are used, so even in cases in which only the sixth portable device 36 is present, it is possible to shorten the time necessary for communication.

In addition, the sixth portable device 36 transmits the first response signal and the second response signal in succession to the on-board device 1, but the transmission timing of the second response signal is the latest timing among the first through sixth portable devices 31, 32, . . . 36. However, because only the sixth portable device 36 exists inside the vehicle or near the outside of the vehicle, the on-board device 1 can receive normally the first response signal transmitted from the sixth portable device 36. Accordingly, the on-board device 1 can accomplish a vehicle inside/outside determination for the sixth portable device 36 and execute vehicle door locking processing or unlocking processing on the basis of the first response signal transmitted from the sixth portable device 36. That is, the on-board device 1 can execute door locking processing or unlocking processing on the basis of the first response signal transmitted first, without waiting for the second response signal transmitted from the sixth portable device 36. The timing for transmitting the first response signal is the same as that of the first portable device 31, so even when the user is holding the sixth portable device 36, the on-board device 1 can lock or unlock the vehicle door with the same processing time as when the user is holding the first portable device 31. Cases where the second portable device 32, the third portable device 33, the fourth portable device 34 and the fifth portable device 35 are used are also the same, and the on-board device 1 can quickly lock or unlock the vehicle door.

Third Example

Figure 8A:
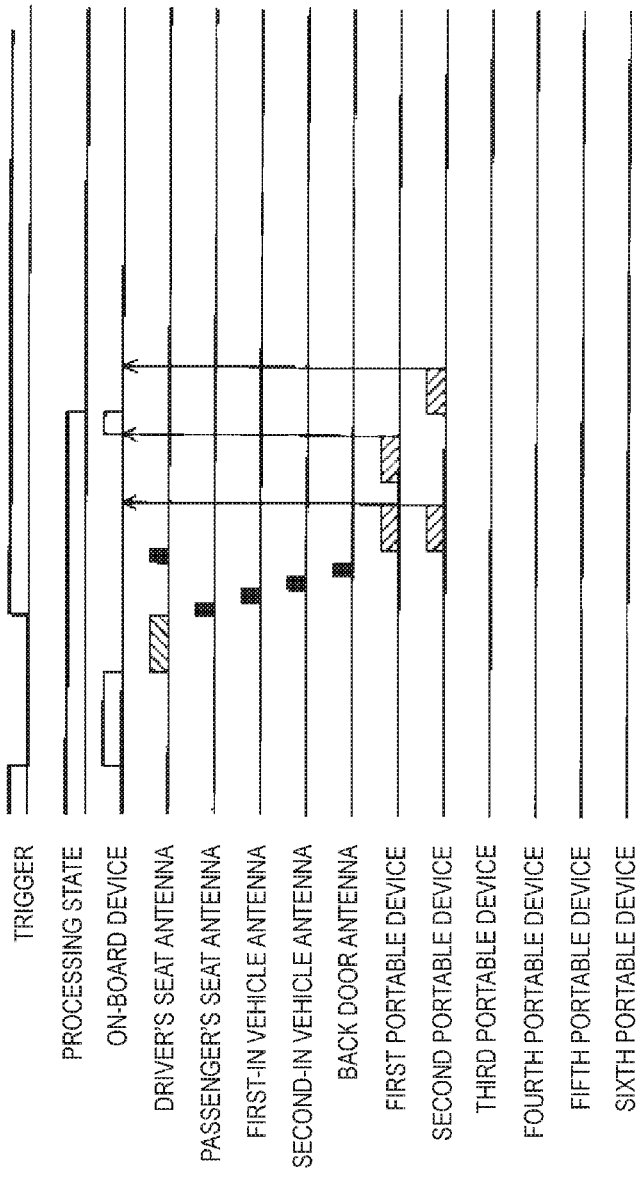
FIG. 8 is an explanatory diagram showing a third example of processing related to vehicle door locking or unlocking.
Figure 8B:
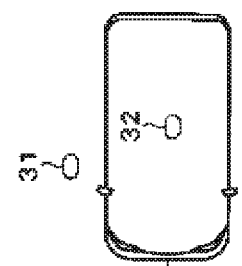

FIG. 8 is an explanatory diagram showing a third example of processing related to vehicle door locking or unlocking. The third example is a case in which the first portable device 31 is outside the vehicle and the second portable device 32 is inside the vehicle, as shown in FIG. 8B. The sequence of transmitting and receiving the processing start signal and the detection signals for vehicle inside/outside determination is the same as in the first example. However, as shown in FIG. 8A, the first portable device 31 and the second portable device 32 transmit the first response signal at the same timing. Furthermore, following transmission of the first response signal, the first portable device 31 transmits the second response signal and the second portable device 32 transmits the second response signal after transmitting and receiving of the second response signal is accomplished between the first portable device 31 and the on-board device 1. In this third example, both the first portable device 31 and the second portable device 32 are present inside the vehicle or near the outside of the vehicle, and because the first response signal is sent with the same timing from the first portable device 31 and the second portable device 32, the on-board device 1 in some cases fails to receive the first response signal.

However, the on-board device 1 can receive the second response signal transmitted from the first portable device 31. Accordingly, the on-board device 1 can accomplish the vehicle inside/outside determination for the first portable device 31 on the basis of the second response signal transmitted from the first portable device 31. In the third example, the first portable device 31 is outside the vehicle, so vehicle door locking processing or unlocking processing is executed. That is, the on-board device 1 can execute door locking processing or unlocking processing on the basis of the second response signal transmitted earlier from the first portable device 31, without waiting for the second response signal transmitted from the second portable device 32. When the driver's seat door switch 41 is depressed with the vehicle door in a locked state as shown in FIG. 8A, the vehicle door is unlocked.

Fourth Example

Figures 9A, 9B:
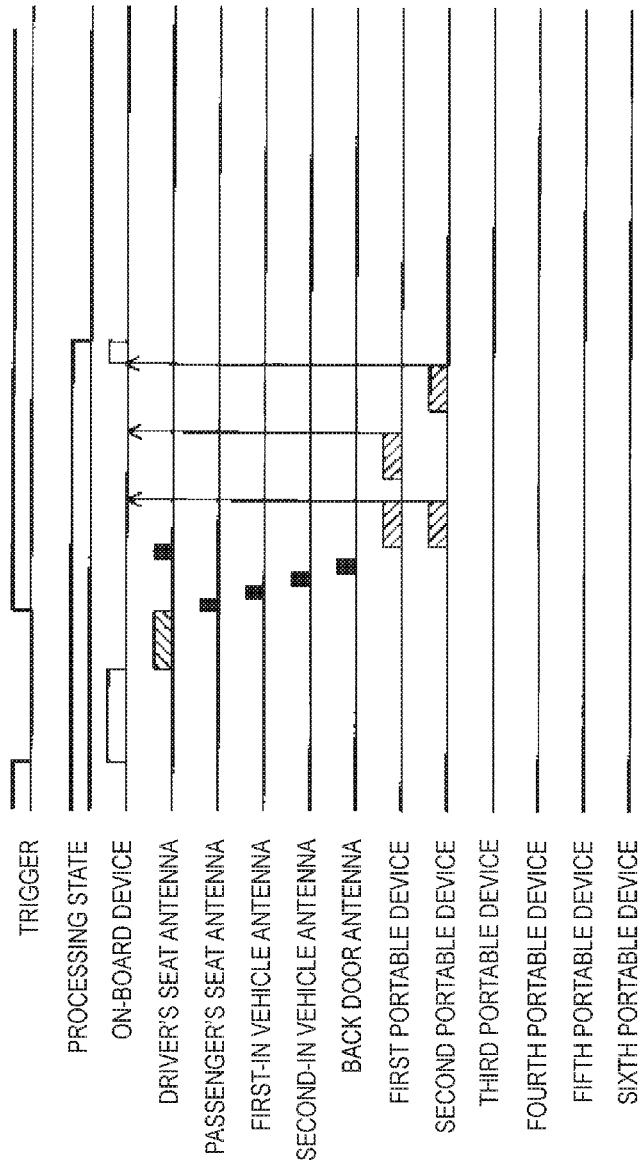
FIG. 9 is an explanatory diagram showing a fourth example of processing related to vehicle door locking or unlocking.

FIG. 9 is an explanatory diagram showing a fourth example of processing related to vehicle door locking or unlocking. The fourth example is a case in which the first portable device 31 is inside the vehicle and the second portable device 32 is outside the vehicle, as shown in FIG. 9B. The sequence of transmitting and receiving the processing start signal, detection signals for vehicle inside/outside determination and response signals is the same as in the third example. In the fourth example, both the first portable device 31 and the second portable device 32 are present inside the vehicle or near the outside of the vehicle, and the first response signal is transmitted from the first portable device 31 and the second portable device 32 at the same timing, as shown in FIG. 9A, so in some cases the on-board device 1 fails to receive the first response signal. However, the on-board device 1 can receive the second response signal transmitted from the first portable device 31, and can accomplish a vehicle inside/outside determination for the first portable device 31 on the basis of the second response signal. In the fourth example, the first portable device 31 is inside the vehicle, so vehicle door locking or unlocking is not performed. Next, the on-board device 1 receives the second response signal transmitted from the second portable device 32 and can accomplish a vehicle inside/outside determination for the second portable device 32 on the basis of the second response signal received. Because the second portable device 32 is present outside the vehicle, the on-board device 1 can execute vehicle door locking processing or unlocking processing on the basis of the second response signal from the second portable device 32. In the fourth example, the process is slower than in the third example, but at the latest, locking processing or unlocking processing can be executed on the basis of the second response signal from the second portable device 32. When the driver's seat door switch 41 is depressed with the vehicle door in a locked state as shown in FIG. 9A, the vehicle door is unlocked.

Fifth Example

FIG. 10 is an explanatory diagram showing a fifth example of processing related to vehicle door locking or unlocking. The fifth example is a case in which the first portable device 31 is inside the vehicle and the sixth portable device 36 is outside the vehicle, as shown in FIG. 10B. The sequence of transmitting and receiving the processing start signal, detection signals for vehicle inside/outside determination and response signals is the same as in the fourth example. In the fifth example, both the first portable device 31 and the sixth portable device 36 are present inside the vehicle or near the outside of the vehicle, and the first response signal is transmitted from the first portable device 31 and the sixth portable device 36 at the same timing, as shown in FIG. 10A, so in some cases the on-board device 1 fails to receive the first response signals. However, the on-board device 1 can receive the second response signal transmitted from the first portable device 31, and can accomplish a vehicle inside/outside determination for the first portable device 31 on the basis of the second response signal. In the fifth example, the first portable device 31 is inside the vehicle, so vehicle door locking or unlocking is not performed. Next, the on-board device 1 receives the second response signal transmitted from the sixth portable device 36 and can accomplish a vehicle inside/outside determination for the sixth portable device 36 on the basis of the second response signal received. Because the sixth portable device 36 is present outside the vehicle, the on-board device 1 can execute vehicle door locking processing or unlocking processing on the basis of the second response signal from the sixth portable device 36. When the driver's seat door switch 41 is depressed with the vehicle door in a locked state as shown in FIG. 10A, the vehicle door is unlocked. The fifth example is a case in which the sixth portable device 36, whose transmission timing of the second response signal is most delayed, is outside the vehicle, but at the latest, locking processing or unlocking processing can be executed on the basis of the second response signal from the sixth portable device 36. The fifth example is an example in which locking processing or unlocking processing is the most delayed in the first embodiment, but because the structure successively transmits the processing start signal and the detection signals for vehicle inside/outside determination to each of the portable devices 3 with different timing for each of the plurality of LF transmission antennas 22, compared to a conventional on-board communication system, it is possible to more efficiently accomplish vehicle inside/outside determination and execute locking processing or unlocking processing. That is, compared to a conventional on-board communication system such that for each of the portable devices 3, the presence or absence of the portable device 3 is confirmed, detection and transmitting and receiving of the received signal strengths is accomplished and a vehicle inside/outside determination is accomplished, it is possible to accomplish vehicle inside/outside determinations for each of the portable devices 3 more quickly.

Sixth Example

Figure 11B:
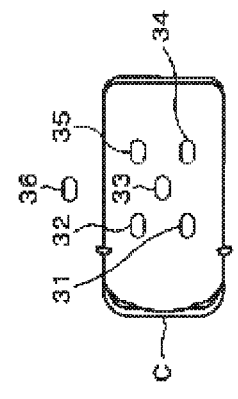

FIG. 11 is an explanatory diagram showing a sixth example of processing related to vehicle door locking or unlocking. As shown in FIG. 11B, the sixth example is a case in which the first through fifth portable devices 31, 32, . . . , 35 are inside the vehicle and the sixth portable device 36 is outside the vehicle. The sequence of transmitting and receiving the processing start signal, detection signals for vehicle inside/outside determination and response signals is the same as in the fifth example. In the sixth example, the first through sixth portable devices 31, 32, . . . , 36 are present inside the vehicle or near the outside of the vehicle, and the first response signal is transmitted from the first through sixth portable devices 31, 32, . . . , 36 at the same timing, as shown in FIG. 11A, so in some cases the on-board device 1 fails to receive the first response signal. However, the on-board device 1 can receive the second response signal transmitted from the first portable device 31, and can accomplish a vehicle inside/outside determination for the first portable device 31 on the basis of the second response signal. In the sixth example, the first portable device 31 is inside the vehicle, so vehicle door locking or unlocking is not performed. Similarly, a vehicle inside/outside determination is accomplished for the second through fifth portable devices 32, 33, 34 and 35, but all of these are present inside the vehicle, so vehicle door locking or unlocking is not performed. Finally, the on-board device 1 receives the second response signal transmitted from the sixth portable device 36 and can perform a vehicle inside/outside determination for the sixth portable device 36 on the basis of the second response signal received. Because the sixth portable device 36 is present outside the vehicle, the on-board device 1 can execute vehicle door locking processing or unlocking processing on the basis of the second response signal from the sixth portable device 36. The sixth example is a case in which the sixth portable device 36, whose transmission timing of the second response signal is most delayed, is outside the vehicle, but at the latest, locking processing or unlocking processing can be executed on the basis of the second response signal from the sixth portable device 36. The sixth example, like the fifth example, is an example in which locking processing or unlocking processing is the most delayed, but because the structure successively transmits the processing start signal and the detection signals for vehicle inside/outside determination to each of the portable devices 3 with different timing for each of the plurality of LF transmission antennas 22, compared to a conventional on-board communication system, it is possible to more efficiently accomplish vehicle inside/outside determination and execute locking processing or unlocking processing. When the driver's seat door switch 41 is depressed with the vehicle door in a locked state as shown in FIG. 11A, the vehicle door is unlocked.

With the on-board communication system, on-board device 1 and portable devices 3 according to the first embodiment, it is possible to shorten the time needed for position detection of the portable devices 3 and enable stable communication of information between the on-board device 1 and the portable devices 3. Specifically, even when a plurality of portable devices 3 are present in the vicinity of the vehicle C, it is possible to efficiently accomplish communication between the on board device 1 and the portable devices 3 and accomplish vehicle inside/outside determinations for the portable devices 3, and to execute vehicle door locking processing or unlocking processing.

In the first embodiment, the on-board transmission unit 12 successively transmits signals for determining the positions of the portable devices 3 from the plurality of LF transmission antennas 22 disposed in the vehicle C with timing that differs for each of the plurality of LF transmission antennas 22, without waiting for responses from the portable devices 3. Furthermore, each of the plurality of portable devices 3 transmits, at the same timing, a first response signal in response to the processing start signal, and transmits a second response signal at a timing different from the second response signals of the other portable devices 3.

The on-board device 1 is configured to detect the positions of the portable devices 3 by transmitting to each of the portable devices 3 detection signals that the plurality of portable devices 3 receives in common, so compared to a case in which communication is accomplished separately with each of the portable devices 3, it is possible to shorten the time necessary for information communication between the on-board device 1 and the portable devices 3, and it is possible to efficiently accomplish position detection of the portable devices 3.

With the first embodiment, the structure is such that each of the portable devices 3 transmits the first response signal and the second response signal using the point in time at which the processing start signal was received from the on-board device 1 as a reference, so it is possible to reliably prevent the second response signals transmitted from each of the portable devices 3 from being transmitted simultaneously. Accordingly, even when the on-board device 1 fails to receive the first response signals transmitted from each of the portable devices 3, the second response signals are reliably received, so it is possible to execute vehicle door locking processing or unlocking processing.

In particular, with the first embodiment, the structure is such that the portable devices 3 transmit the first response signals and the second response signals including information corresponding to the detection signals transmitted from each of the LF transmission antennas 22, so the on-board device 1 can accomplish vehicle inside/outside determination for the portable devices 3 on the basis of the first response signals and the second response signals.

In the first embodiment, the structure is such that the plurality of portable devices 3 transmits the first response signals simultaneously with timing that matches, and then transmits the second response signals with timing that differs for each of the plurality of portable devices 3. Accordingly, even when the transmission timing of the first response signal and the second response signal approach each other, there is no worry that the first response signal and the second response signal will interfere. Consequently, it is possible to make the design such that the plurality of portable devices 3 can complete the transmission of the first response signals and the second response signals in the shortest time possible, and the on-board device 1 can receive the first response signals and the second response signals at an early time.

In addition, the on-board device 1 is configured to detect the positions of the portable devices 3 by transmitting to each of the portable devices 3 a processing start signal and detection signals that the plurality of portable devices 3 receives in common, so compared to a case in which communication is accomplished separately with each of the portable devices 3, it is possible to shorten the time necessary for information communication between the on-board device 1 and the portable devices 3, and it is possible to efficiently accomplish position detection of the portable devices 3.

Furthermore, after transmitting the processing start signal, the on-board device 1 transmits detection signals without waiting for a response from the portable devices 3 that received the processing start signal. Accordingly, it is possible to shorten the time necessary for information communication between the on-board device 1 and the portable devices 3, and it is possible to efficiently accomplish position detection of the portable devices 3.

Furthermore, in the first embodiment, the portable devices 3 detect the received signal strengths of the detection signals transmitted from each of the LF transmission antennas 22 and transmit first response signals and second response signals including the received signal strengths detected, so the on-board device 1 can identify the positions of the portable devices 3 on the basis of the received signal strengths included in the response signals received. By using the received signal strengths of the detection signals from the plurality of LF transmission antennas 22, it is possible to identify with good precision the positions of the portable devices 3.

Furthermore, with a structure that accomplishes vehicle inside/outside determination on the portable device 3 side, a portable device 3 detects the received signal strengths of the detection signals transmitted from each of the LF transmission antennas 22 and identifies its own position on the basis of the received signal strengths detected. In addition, the portable device 3 transmits information relating to its own position that has been identified to the on-board device 1, and the on-board device 1 can accomplish vehicle inside/outside determination for the portable device 3 on the basis of the information included in the response signals received. By using the received signal strengths of the detection signals from the plurality of LF transmission antennas 22, it is possible to identify with good precision the positions of the portable devices 3.

Furthermore, if one portable device 3 is present inside the vehicle or near the vehicle C, a vehicle inside/outside determination is performed for the portable device 3 through the first response signal transmitted at an early time, and vehicle door locking processing or unlocking processing can be executed.

Even when a plurality of portable devices 3 are present inside the vehicle or near the vehicle C, vehicle door locking processing or unlocking processing can be executed on the basis of the second response signal transmitted from each portable device 3.

In the first embodiment, an example was described in which the on-board device 1 accomplishes vehicle inside/outside determinations for the portable devices 3, but it would be acceptable to have a structure such that a portable device 3 accomplishes its own vehicle inside/outside determination, and transmits to the on-board device 1 the first response signal and the second response signal including the result of the vehicle inside/outside determination, as information corresponding to detection signals transmitted from the LF transmission antennas 22.

Additionally, in the first embodiment, an example was described in which the positions of the portable devices 3 are detected using the detection signals transmitted from a plurality of LF transmission antennas 22, but the structure can be such that the positions of the portable devices 3 are detected using a detection signal transmitted from a single LF transmission antenna 22. For example, if there is only a need for finding a portable device 3 inside the vehicle, for example, as in the case of engine starting, it is not necessarily required for the position to be detected by a plurality of LF antennas, and the structure can be such that the position of a portable device 3 is detected by only one LF antenna inside the vehicle. Similarly, this can also be accomplished in other embodiments.

In the first embodiment, an example was described in which a plurality of portable devices 3 transmits the first response signals simultaneously, but it is not necessarily required for the first response signals to be transmitted simultaneously.

Second Embodiment

<Processing at Time of Engine Starting and at Time of Engine Running>

The structure of the on-board communication system according to a second embodiment is the same as that of the first embodiment, and the same reference symbols are attached to corresponding structures and detailed explanation is omitted.

Figure 12:
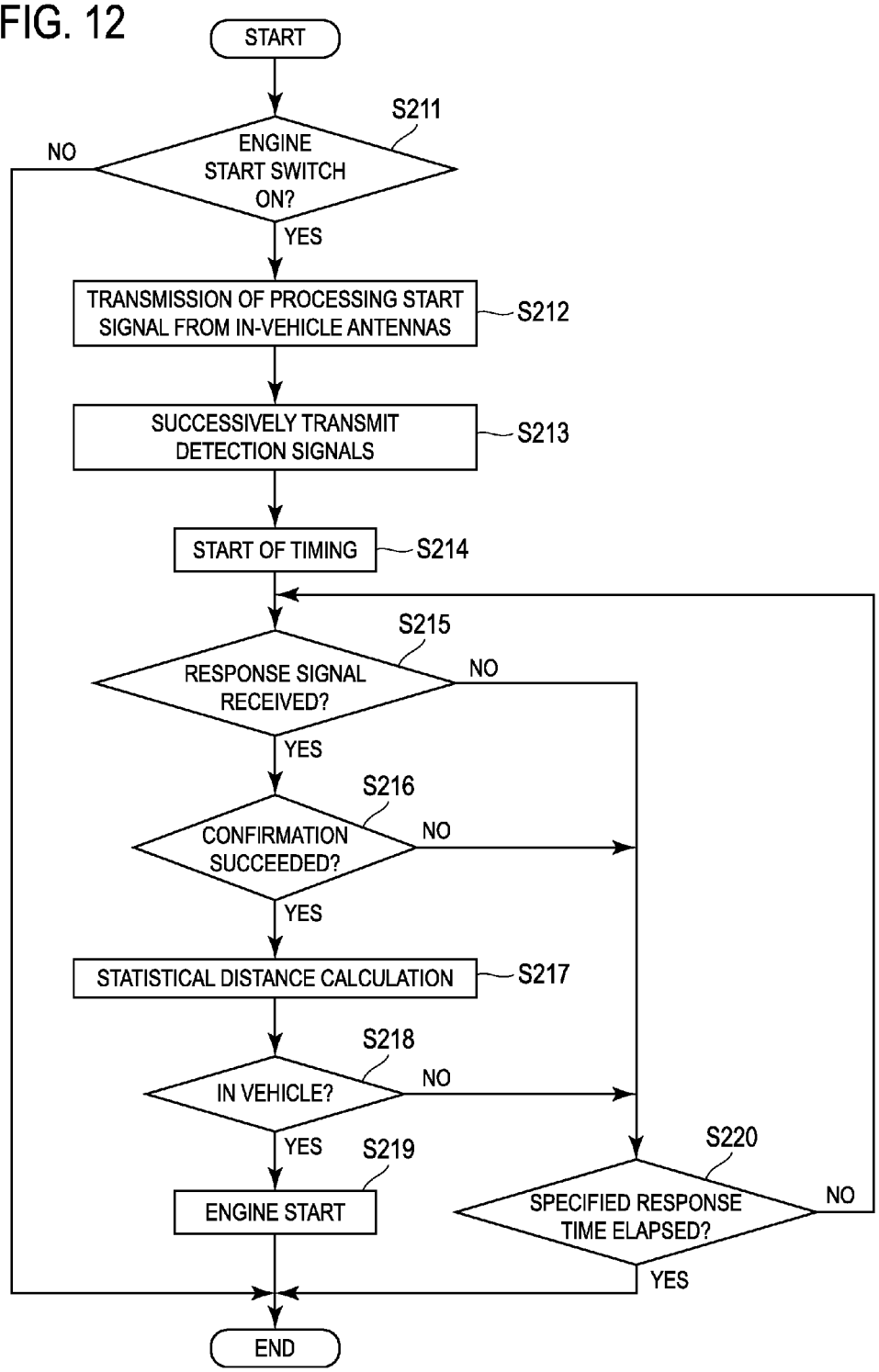
FIG. 12 is a flowchart showing a processing sequence at the time of engine starting.

FIG. 12 is a flowchart showing a processing sequence at the time of engine starting. FIG. 13 is an explanatory diagram showing a first example of processing related to engine starting. The on-board control unit 10 of the on-board device 1 monitors the operation state of an engine start switch and determines whether or not the engine start switch is in an on state (step S211). The on state is a state in which the engine start switch is depressed, and the off state is a state in which the engine start switch is not depressed.

Figures 13A, 13B:
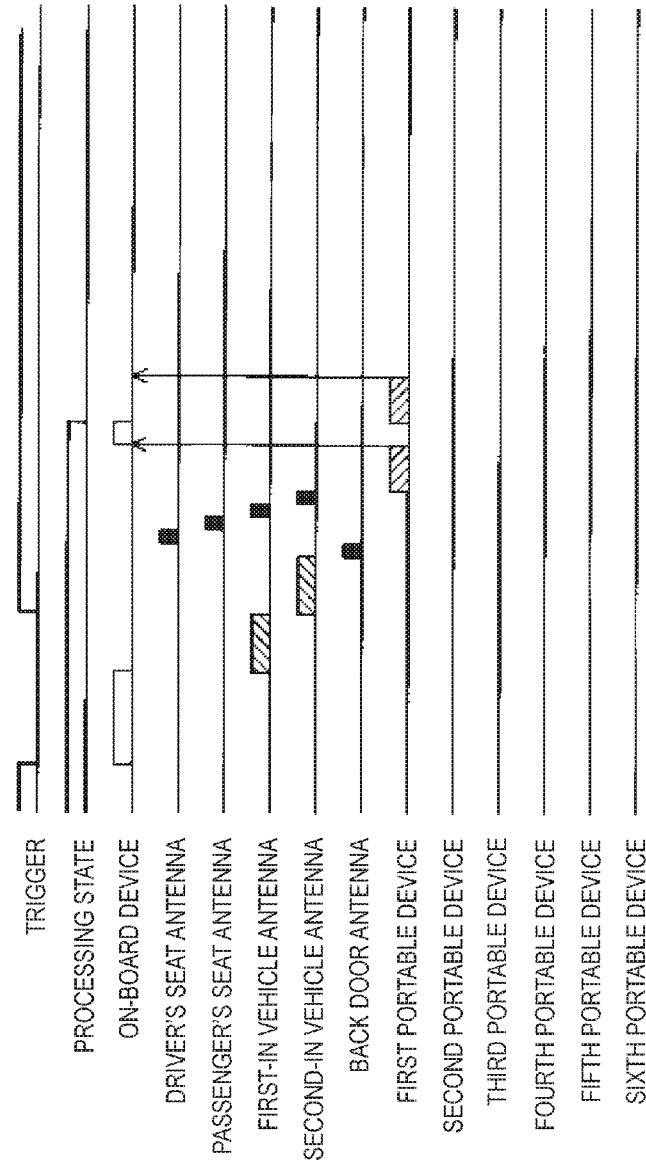
FIG. 13 is an explanatory diagram showing a first example of processing related to engine starting.

In FIG. 13A, "trigger" shows the operation state of the engine start switch. A high-level trigger signal corresponds to a state in which the engine start switch is not depressed, and a low-level trigger signal corresponds to a state in which the engine start switch is depressed. In addition, "processing state" shows the driving state of the engine. The driving state of the engine is indicated by the vertical height indicated by the bold line. The state in which the bold line is positioned at the top corresponds to the state in which the engine is stopped, and the state in which the bold line is positioned at the bottom corresponds to the state in which the engine is driven.

When it is determined that the engine start switch is in an off state (step S211: No), the on-board control unit 10 ends processing. When it is determined that the engine start switch is in an on state (step S211; Yes), the on-board control unit 10 executes in steps S212 to S218 transmission of the processing start signal and the detection signals for vehicle inside/outside determination, receiving of the response signals, confirmation processing and vehicle inside/outside determination processing, the same as in step S112 to step S118 of the first embodiment. However, in step S212, the on-board control unit 10 controls the operations of the on-board transmission unit 12 such that the processing start signals are successively transmitted using LF-band radio waves, from the first in-vehicle antenna 22c and the second in-vehicle antenna 22d. That is, first the processing start signal is transmitted from the first in-vehicle antenna 22c, and then the processing start signal is transmitted from the second in-vehicle antenna 22d.

The processing start signals are transmitted only from the first and second in-vehicle antennas 22c and 22d. This is because (i) a requirement for confirmation that a portable device 3 is inside the vehicle is a requirement for engine starting, and even if there is a legitimate portable device 3, if it is outside the vehicle, engine starting will not be performed; and (ii) there is no need for operations that transmit processing start signals from the three out-of-vehicle antennas, that is, the driver's seat antenna 22a, the passenger's seat antenna 22b and the back door antenna 22e, which transmit the various types of signals primarily to portable devices 3 outside the vehicle, and activate portable devices 3 outside the vehicle.

Meanwhile, the first and second in-vehicle antennas 22c and 22d cover the entire signal transmission area inside the vehicle with the two in-vehicle antennas, so it is necessary to transmit the processing start signals from two in-vehicle antennas, namely the first and second in-vehicle antennas 22c and 22d.

When it is determined in step S218 that a portable device 3 is inside the vehicle (step S218: Yes), the on-board control unit 10 executes processing to cause the engine to be started (step S219), and ends processing. More specifically, the on-board control unit 10 of the on-board device 1 executes processing to transmit to an undepicted engine ECU a signal commanding starting of the engine.

In this embodiment, when it is determined that even one portable device 3 is inside the vehicle, the on-board control unit 10 executes processing to cause starting of the engine without waiting for response signals from other portable devices 3.

When it is determined in step S218 that the portable devices 3 are outside the vehicle (step S218: No), when it is determined that a response signal has not been received (step S215: No), or when it is determined that confirmation has failed (step S216: No), the on-board control unit 10 determines whether or not a prescribed response time has elapsed (step S220). When it is determined that the prescribed response time has not elapsed (step S220: No), the on-board control unit 10 returns processing to step S215. When it is determined that the prescribed time has elapsed (step S220: Yes), the on-board control unit 10 ends processing.

Similar to the first embodiment, the structure may be such that the primary processing for computation of the statistical distances and the vehicle inside/outside determination are executed by the portable devices 3.

In addition, in the second embodiment, the structure is such that the processing start signals are transmitted from both the first in-vehicle antenna 22c and the second in-vehicle antenna 22d, but the portable devices 3 may cause a single processing start signal or detection signal transmitted from either of the in-vehicle antennas, namely the first in-vehicle antenna 22c or the second in-vehicle antenna 22d, to function as the timing start signal.

That is, if a processing start signal is caused to function as the timing start signal, the processing start signal transmitted from the first in-vehicle antenna 22c may be caused to function as the timing start signal, or the processing start signal transmitted from the second in-vehicle antenna 22d may also be caused to function as the timing start signal. Similarly, if a detection signal is caused to function as the timing start signal, the detection signal transmitted from the first in-vehicle antenna 22c may be caused to function as the timing start signal, or the detection signal transmitted from the second in-vehicle antenna 22d may also be caused to function as the timing start signal.

For example, there is a case in which one of the portable devices 3 can receive only the processing start signal and the detection signal transmitted from the first in-vehicle antenna 22c, and another portable device 3 can receive only the processing start signal and the detection signal transmitted from the second in-vehicle antenna 22d. In this case, the one portable device 3 uses the processing start signal or the detection signal transmitted from the first in-vehicle antenna 22c as the timing start signal, and the other portable device 3 uses the processing start signal or the detection signal transmitted from the second in-vehicle antenna 22d as the timing start signal.

Because the reception timing of the processing start signal and the detection signal differs depending on whether the processing start signal and the detection signal were transmitted from the first in-vehicle antenna 22c or the second in-vehicle antenna 22d, the timing start timing differs. Consequently, there are cases in which the transmission timing of the first response signal and the second response signal will deviate somewhat. However, because both the processing start signal and the detection signal are successively transmitted from the first and the second in-vehicle antennas 22c and 22d, the deviation in the transmission timing will be slight, and thus does not become a problem. The plurality of portable devices 3 transmit the first response signals at roughly the same timing, and can transmit the second response signals at timings that do not interfere.

Next, operation of an on-board communication system configured in this manner is described.

First Example

The first example is a case in which the first portable device 31 is inside the vehicle, as shown in FIG. 13B. When the user has depressed the engine start switch, as shown in FIG. 13A the on-board device 1 transmits the processing start signal from the first in-vehicle antenna 22c and the second in-vehicle antenna 22d, and then successively transmits detection signals for vehicle inside/outside determination from each of the LF transmission antennas 22 at timing that differs for each of the plurality of LF transmission antennas 22. Because the user is holding the first portable device 31, the first portable device 31 receives the processing start signals, measures the received signal strengths of the detection signals transmitted from each of the LF transmission antennas 22 and successively transmits to the on-board device 1 a first response signal and a second response signal including information about the received signal strengths that were measured. Because only the first portable device 31 exists inside the vehicle or near the outside of the vehicle, the on-board device 1 can receive the first response signal transmitted from the first portable device 31. Accordingly, the on-board device 1 accomplishes a vehicle inside/outside determination for the first portable device 31, on the basis of the first response signal transmitted from the first portable device 31. In the first example, the first portable device 31 is inside the vehicle, so the on-board control unit 10 of the on-board device 1 can execute processing to cause the engine to start, on the basis of the first response signal transmitted first from the first portable device 31.

Second Example

Figure 14A:
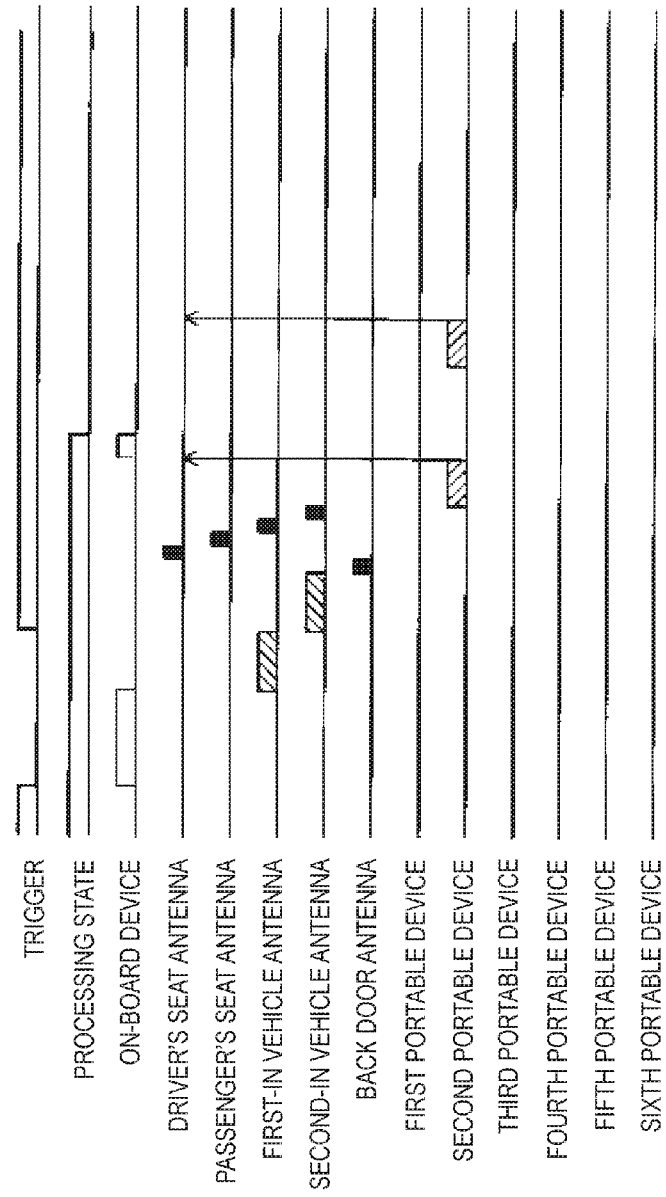
FIG. 14 is an explanatory diagram showing a second example of processing related to engine starting.
Figure 14B:
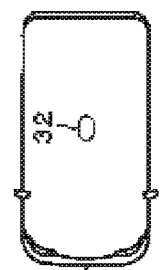

FIG. 14 is an explanatory diagram showing a second example of processing related to engine starting. As shown in FIG. 14B, the second portable device 32 is inside the vehicle. The sequence of transmitting and receiving the processing start signals and the detection signals for vehicle inside/outside determination is the same as in the first example. However, the second portable device 32 transmits the first response signal and the second response signal successively to the on-board device 1, but the transmission timing of the second response signal is later than the first portable device 31. However, because only the second portable device 32 is present inside the vehicle or near the outside of the vehicle, the on-board device 1 can receive the first response signal transmitted from the second portable device 32. Accordingly, the on-board device 1 accomplishes a vehicle inside/outside determination for the second portable device 32 on the basis of the first response signal transmitted from the second portable device 32, and can execute processing to cause the engine to start. That is, the on-board device 1 can execute processing to cause the engine to start on the basis of the first response signal transmitted first, without waiting for the second response signal transmitted from the second portable device 32. The timing of transmitting the first response signal is the same as the first portable device 31, so even if the user is holding the second portable device 32, the on-board device 1 can cause the engine to start with the same processing time as when the user is holding the first portable device 31. Cases in which the third portable device 33, the fourth portable device 34, the fifth portable device 35 and the sixth portable device 36 are used are the same, and the on-board device 1 can cause the engine to start swiftly.

Third Example

Figures 15A, 15B:
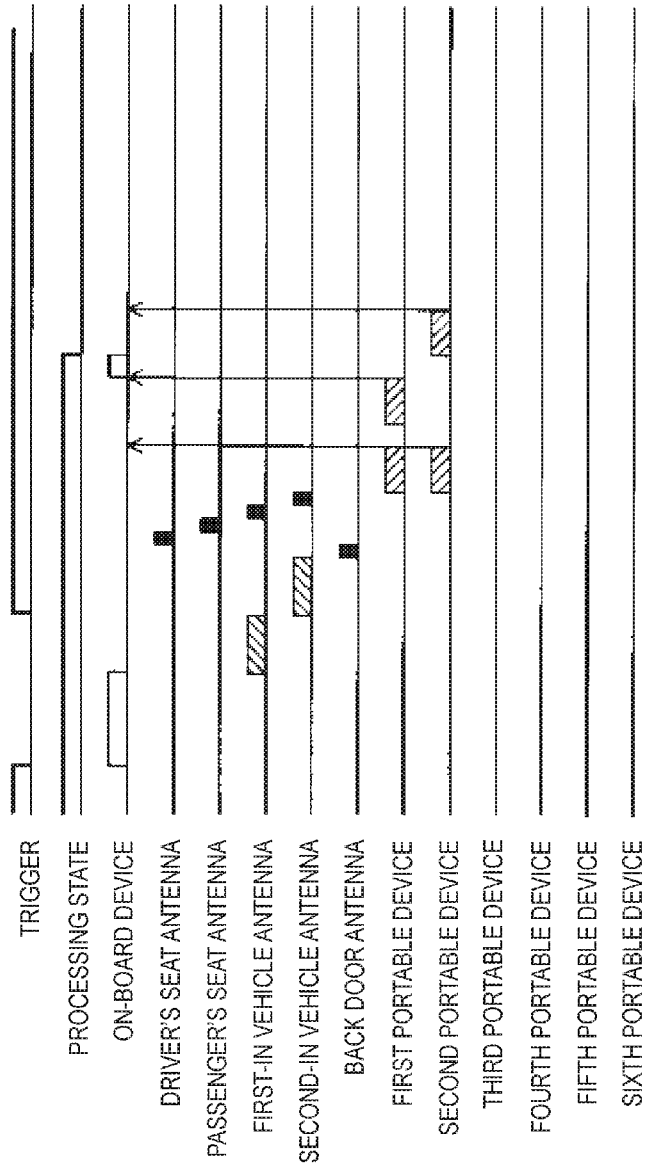
FIG. 15 is an explanatory diagram showing a third example of processing related to engine starting.

FIG. 15 is an explanatory diagram showing a third example of processing related to engine starting. The third example is a case in which the first portable device 31 is inside the vehicle and the second portable device 32 is outside the vehicle, as shown in FIG. 15B. The sequence of transmitting and receiving the processing start signals and the detection signals for vehicle inside/outside determination is the same as in the first example. However, as shown in FIG. 15A, the first portable device 31 and the second portable device 32 transmit first response signals at the same timing. Furthermore, following transmission of the first response signal, the first portable device 31 transmits the second response signal, and the second portable device 32 transmits the second response signal after transmitting and receiving of the second response signal between the first portable device 31 and the on-board device 1 is accomplished. In the third example, both the first portable device 31 and the second portable device 32 are present inside the vehicle or near the outside of the vehicle, and because the first response signals are transmitted from the first portable device 31 and the second portable device 32 at the same timing, there are cases in which the on-board device 1 fails to receive the first response signals.

However, the on-board device 1 can receive the second response signal transmitted from the first portable device 31. Accordingly, the on-board device 1 can accomplish a vehicle inside/outside determination for the first portable device 31, on the basis of the second response signal transmitted from the first portable device 31. Because the first portable device 31 is inside the vehicle in the third example, processing to cause the engine to start is executed. That is, the on-board device 1 can execute processing to cause the engine to start on the basis of the second response signal transmitted first, from the first portable device 31, without waiting for the second response signal transmitted from the second portable device 32.

Fourth Example

FIG. 16 is an explanatory diagram showing a fourth example of processing related to engine starting. The fourth example is a case in which the first portable device 31 is outside the vehicle and the sixth portable device 36 is inside the vehicle, as shown in FIG. 16B. The sequence of transmitting and receiving the processing start signals and the detection signals for vehicle inside/outside determination, and transmitting and receiving response signals, is the same as in the third example. In the fourth example, both the first portable device 31 and the sixth portable device 36 are present inside the vehicle or near the outside of the vehicle, and because the first response signals are transmitted from the first portable device 31 and the sixth portable device 36 at the same timing as shown in FIG. 16A, there are cases in which the on-board device 1 fails to receive the first response signals. However, the on-board device 1 can receive the second response signal transmitted from the first portable device 31, and can accomplish a vehicle inside/outside determination for the first portable device 31 on the basis of the second response signal. Because the first portable device 31 is outside the vehicle in the fourth example, processing to cause the engine to start is not executed. Next, the on-board device 1 receives the second response signal transmitted from the sixth portable device 36 and can accomplish a vehicle inside/outside determination for the sixth portable device 36 on the basis of the second response signal received. Because the sixth portable device 36 is present inside the vehicle, the on-board device 1 can execute processing to cause the engine to start, on the basis of the second response signal from the sixth portable device 36. In the fourth example, processing is slow compared to the third example, but at the latest, processing to cause the engine to start can be executed on the basis of the second response signal from the sixth portable device 36. The fourth example is an example in which processing for engine starting is delayed the most in the second embodiment, but because the structure is such that the processing start signal and the detection signals for vehicle inside/outside determination are transmitted successively to the each of the portable devices 3 at timing that differs for each of the plurality of LF transmission antennas 22, vehicle inside/outside determination can be accomplished, and processing to cause the engine to start can be executed, more efficiently than in a conventional on-board communication system.

Fifth Example

Figure 17A:
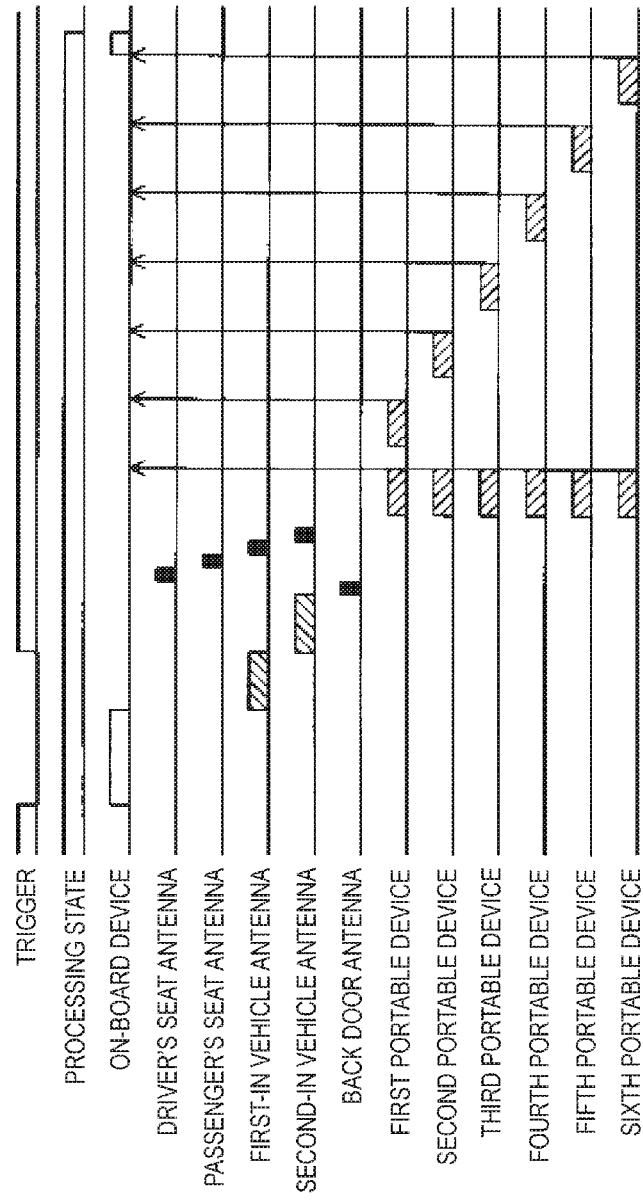
FIG. 17 is an explanatory diagram showing a fifth example of processing related to engine starting.
Figure 17B:
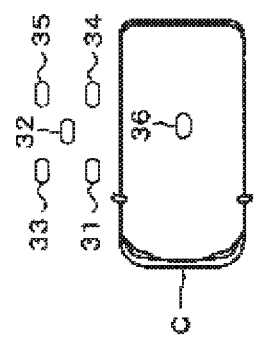

FIG. 17 is an explanatory diagram showing a fifth example of processing related to engine starting. The fifth example is a case in which the first through fifth portable devices 31, 32, . . . , 35 are outside the vehicle and the sixth portable device 36 is inside the vehicle, as shown in FIG. 17B. The sequence of transmitting and receiving the processing start signals and the detection signals for vehicle inside/outside determination, and transmitting and receiving response signals, is the same as in the fourth example. In the fifth example, the first through sixth portable devices 31, 32, . . . , 36 are present inside the vehicle or near the outside of the vehicle, and because the first response signals are transmitted from the first through sixth portable devices 31, 32, . . . , 36 at the same timing as shown in FIG. 17A, there are cases in which the on-board device 1 fails to receive the first response signals. However, the on-board device 1 can receive the second response signal transmitted from the first portable device 31, and can accomplish a vehicle inside/outside determination for the first portable device 31 on the basis of the second response signal. Because the first portable device 31 is outside the vehicle in the fifth example, processing to cause the engine to start is not executed. Similarly, a vehicle inside/outside determination is accomplished for the second through fifth portable devices 32, 33, 34 and 35, but because these are all present outside the vehicle, processing to cause the engine to start is not executed. Finally, the on-board device 1 receives the second response signal transmitted from the sixth portable device 36 and can accomplish a vehicle inside/outside determination for the sixth portable device 36 on the basis of the second response signal received. Because the sixth portable device 36 is present inside the vehicle, the on-board device 1 can execute processing to cause the engine to start, on the basis of the second response signal from the sixth portable device 36. The fifth example is a case in which the sixth portable device 36, which has the most delayed transmission timing for the second response signal, is inside the vehicle, but at the latest, processing to cause the engine to start can be executed on the basis of the second response signal from the sixth portable device 36. The fifth example, like the fourth example, is an example in which processing for engine starting is delayed the most, but because the structure is such that the processing start signals and the detection signals for vehicle inside/outside determination are transmitted successively to the each of the portable devices 3 at timing that differs for each of the plurality of LF transmission antennas 22, vehicle inside/outside determination can be accomplished, and processing to cause the engine to start can be executed, more efficiently than in a conventional on-board communication system.

Processing at the time of engine starting was described in the second embodiment, but processing of the second embodiment can also be applied to processing to confirm that a portable device 3 is present inside the vehicle while the engine is running.

With the on-board communication system, on-board device 1 and portable devices 3 according to the second embodiment, it is possible to shorten the time needed for position detection of the portable devices 3, the same as in the first embodiment and enable stable communication of information between the on-board device 1 and the portable devices 3. Specifically, even when a plurality of portable devices 3 are present in the vicinity of the vehicle C, it is possible to efficiently accomplish communication between the on-board device 1, to accomplish vehicle inside/outside determinations for the portable devices 3, and to execute engine start processing.

In addition, in processing for position detection of the portable devices 3 relating to engine starting, the structure is such that processing start signals are transmitted from the first in-vehicle antenna 22c and the second in-vehicle antenna 22d out of the plurality of LF transmission antennas 22, and processing start signals are not transmitted from the other LF transmission antennas 22, so it is possible to further improve responsiveness of the on-board communication system.

Third Embodiment

<Processing Relating to Trunk Lock-In Prevention>

The structure of the on-board communication system according to a third embodiment is the same as that of the first embodiment, and the same reference symbols are attached to corresponding structures and detailed explanation is omitted.

In addition to the structures that are the same as in the on-board communication system of the first embodiment, the on-board communication system according to the third embodiment comprises an undepicted trunk antenna. The trunk antenna is one of the LF transmission antennas 22. The trunk antenna is disposed inside the trunk of the vehicle C and is structured such that the on-board transmission unit 12 transmits various types of signals from the trunk antenna under control by the on-board control unit 10. The remainder of the structure is the same as that of the first embodiment, and the same reference symbols are attached to the corresponding structures and detailed explanation is omitted.

Figure 18:
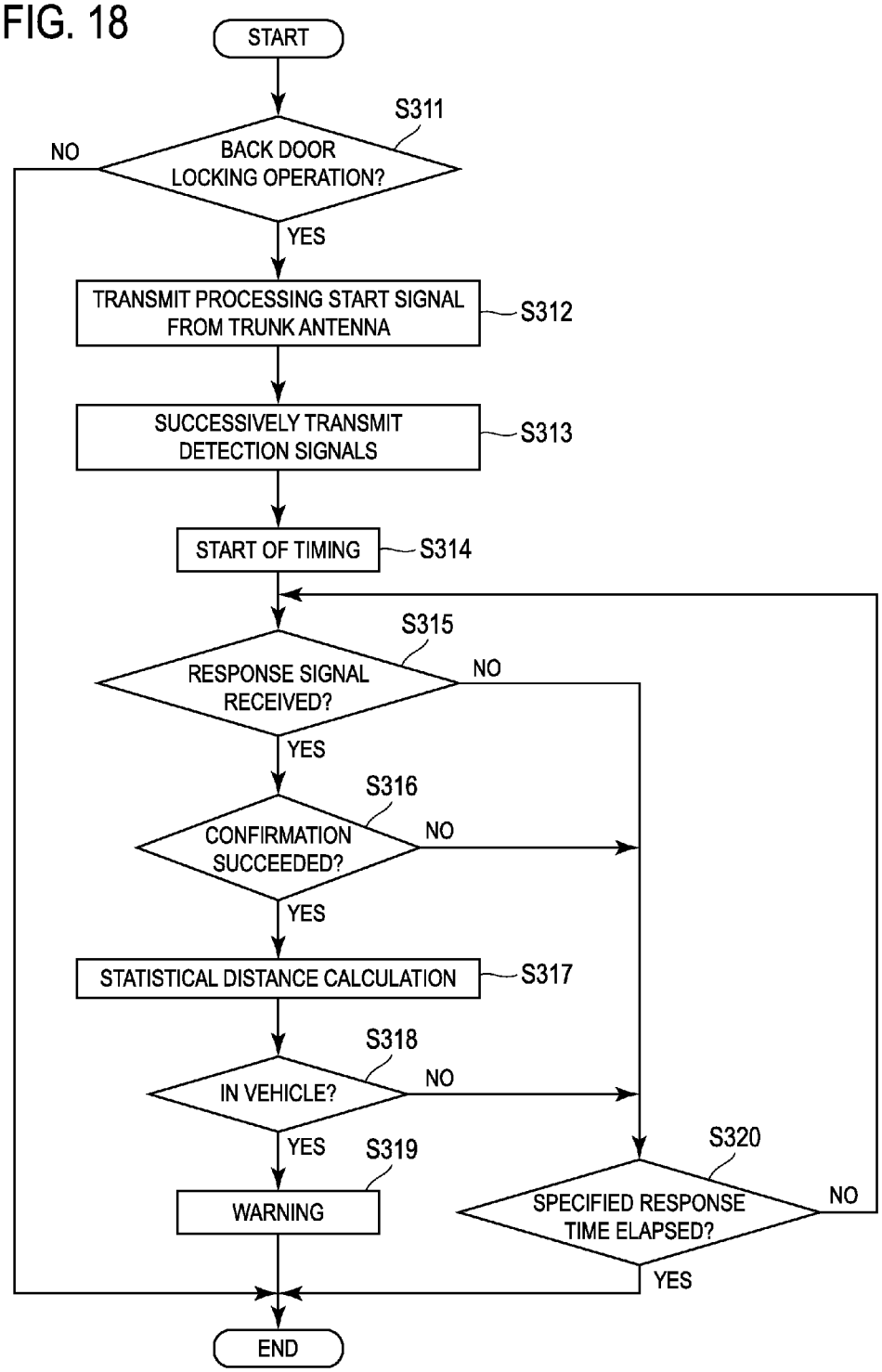
FIG. 18 is a flowchart showing a processing sequence related to trunk lock-in prevention.

FIG. 18 is a flowchart showing a processing sequence related to trunk lock-in prevention. FIG. 19 is an explanatory diagram showing a first example of processing related to preventing trunk lock-in.

The on-board control unit 10 of the on-board device 1 monitors the operation state of the back door switch 43, and determines whether or not a locking operation was performed by the back door switch 43 (step S311). That is, the on-board control unit 10 determines whether or not the back door switch 43 has been depressed, in a state in which the back door is unlocked.

Figure 19A:
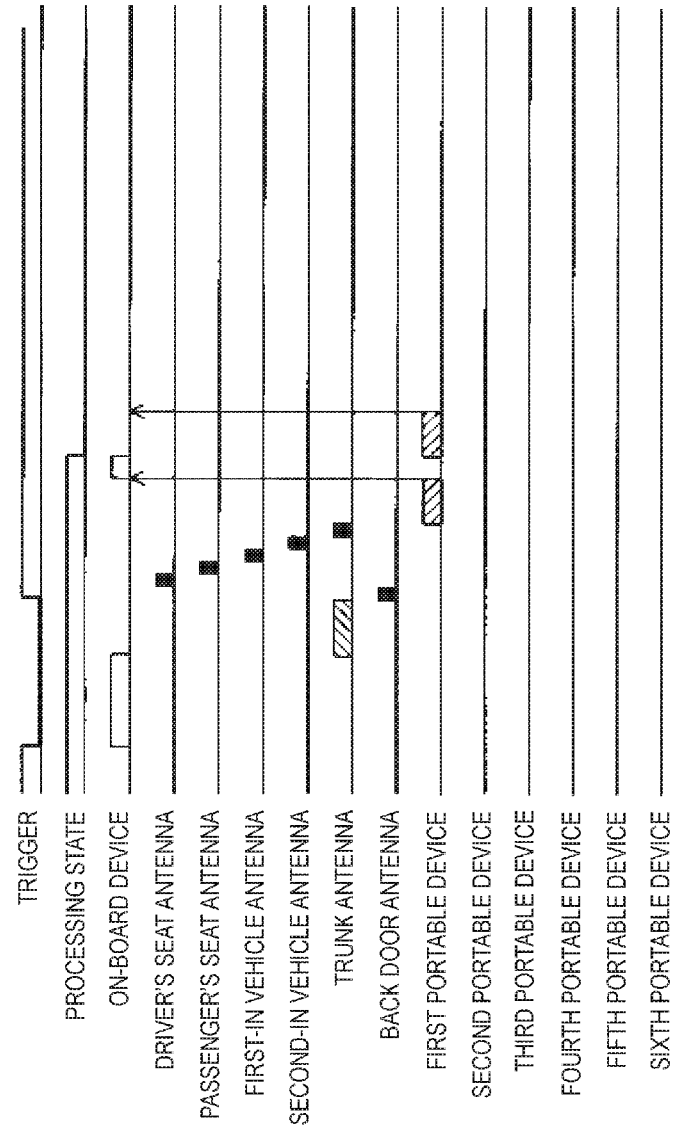
FIG. 19 is an explanatory diagram showing a first example of processing related to trunk lock-in prevention.

In FIG. 19A, "trigger" shows the state of a locking operation by the back door switch 43. A high-level trigger signal corresponds to a state in which the back door switch 43 is not depressed, and a low-level trigger signal corresponds to a state in which a locking operation has been performed by the back door switch 43. In addition, "processing state" shows a warning processing state relating to trunk lock-in of the portable devices 3. The warning processing state is indicated by vertical height indicated by the bold line. The state in which the bold line is positioned at the top corresponds to the state in which warning processing is not performed, and a state in which the bold line is positioned at the bottom indicates a state in which warning processing is performed.

When it is determined that a locking operation has not been performed by the back door switch 43 (step S311: No), the on-board control unit 10 ends processing. When it is determined that a locking operation has been performed by the back door switch 43 (step S311: Yes), the on-board control unit 10 controls the operations of the on-board transmission unit 12 such that a processing start signal is transmitted from the trunk antenna (step S312). Next, the on-board control unit 10 executes transmission of detection signals for a vehicle inside/outside determination, reception of response signals, confirmation processing and processing of the vehicle inside/outside determination in steps S313 to S318, the same as in steps S113 to S118 of the first embodiment.

When it is determined in step S318 that a portable device 3 is inside the vehicle (step S318: Yes), the on-board control unit 10 executes processing to issue a warning (step S319) and then ends processing. The warning of step S319 is to notify the user that the portable device 3 is being locked in the trunk. The method of the warning is not particularly limited, and issuing a warning sound is acceptable, causing a warning lamp to flash is acceptable and accomplishing a warning by causing the vehicle C and the on-board device 1 to perform specific actions is also acceptable.

In this embodiment, when it is determined that even one of the portable device 3 is in the vehicle, the on-board control unit 10 executes processing to issue a warning without waiting for a response signal from another portable device 3.

When it is determined in step S318 that a portable device 3 is outside the vehicle (step S318: No), when it is determined that a response signal has not been received (step S315: No) or when it is determined that confirmation has failed (step S316: No), the on-board control unit 10 determines whether or not a prescribed response time has elapsed (step S320). When the prescribed response time has not elapsed (step S320: No), the on-board control unit 10 returns processing to step S315. When it is determined that the prescribed time has elapsed (step S320: Yes), the on-board control unit 10 ends processing.

In FIG. 18, processing related to locking the back door is not described, but processing relating to separately locking the back door may be executed. It is also acceptable, if at least one of the portable devices 3 is outside the vehicle, for the vehicle doors to be locked even if another portable device 3 is inside the trunk. A structure is also acceptable in which vehicle doors lock on condition that a portable device 3 is not present in the trunk.

Similar to the first embodiment, the structure may be such that primary processing for the statistical distance computation and the vehicle inside/outside determination is executed by the portable device 3.

Next, the operation of an on-board communication system structured as above is described.

First Example

Figure 19B:
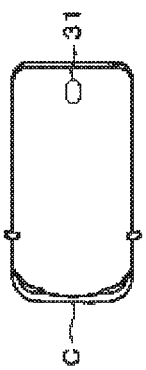

FIG. 19 is an explanatory diagram showing a first example of processing related to preventing trunk lock-in. The first example is a case in which the first portable device 31 is inside the trunk, as shown in FIG. 19B. When the user depresses the back door switch 43 and a trunk locking operation is performed, as shown in FIG. 19A the on-board device 1 transmits a processing start signal from the trunk antenna, and then detection signals for vehicle inside/outside determination are transmitted successively from each of the LF transmission antennas 22 at timing that differs for each of the plurality of LF transmission antennas 22. Because the first portable device 31 is present in the trunk, the first portable device 31 receives the processing start signal, measures the received signal strengths of signals transmitted from each of the LF transmission antennas 22 and successively transmits to the on-board device 1 a first response signal and a second response signal including information about the received signal strengths measured. Because only the first portable device 31 is present inside the vehicle or near the outside of the vehicle, the on-board device 1 can receive the first response signal transmitted from the first portable device 31. Accordingly, the on-board device 1 performs a vehicle inside/outside determination for the first portable device 31 on the basis of the first response signal transmitted from the first portable device 31. Because in the first example the first portable device 31 is inside the trunk, the on-board control unit 10 of the on-board device 1 can accomplish the vehicle inside/outside determination on the basis of the first response signal transmitted first from the first portable device 31, and can issue a warning to prevent the portable device 3 from being locked in the trunk.

Second Example

Figure 20A:
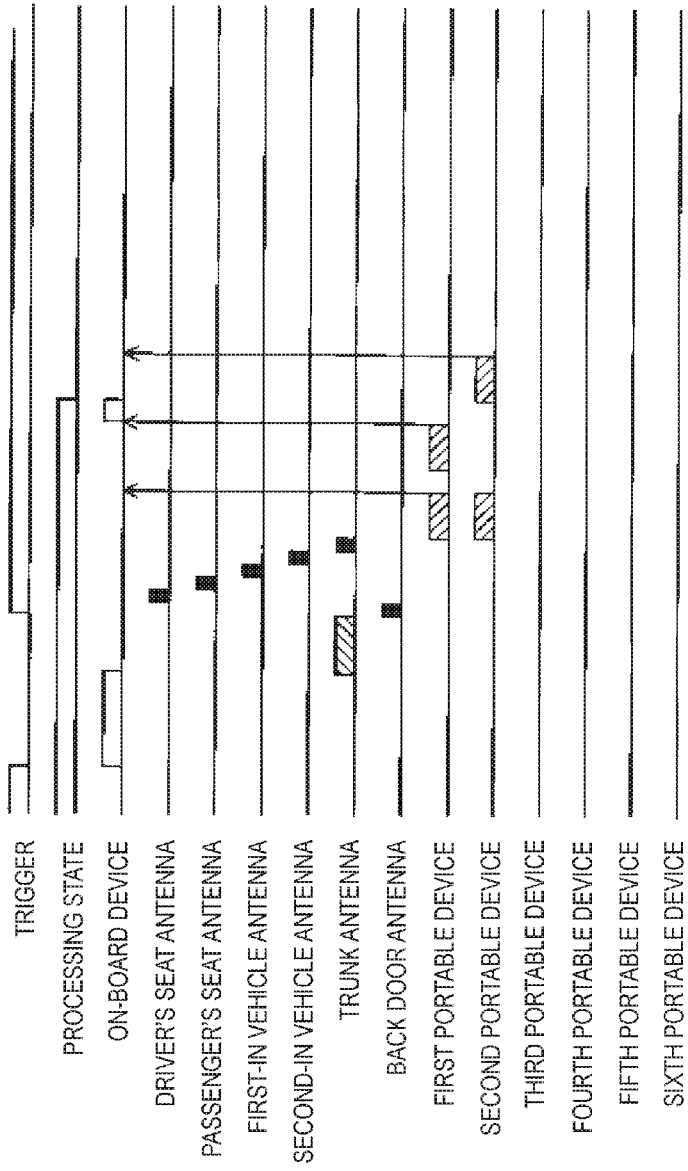
FIG. 20 is an explanatory diagram showing a second example of processing related to trunk lock-in prevention.
Figure 20B:
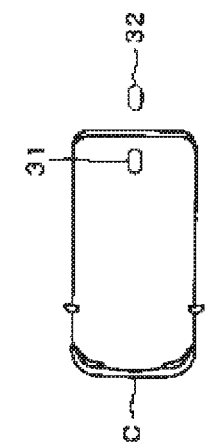

FIG. 20 is an explanatory diagram showing a second example of processing related to preventing trunk lock-in. The second example is a case in which the first portable device 31 is inside the trunk and the second portable device 32 is outside the vehicle, as shown in FIG. 20B. The sequence of transmitting and receiving the processing start signal and the detection signals for vehicle inside/outside determination is the same as in the first example. However, as shown in FIG. 20A, the first portable device 31 and the second portable device 32 transmit the first response signals at the same timing. Furthermore, following transmission of the first response signals, the first portable device 31 transmits the second response signal and the second portable device 32 transmits the second response signal after transmitting and receiving of the second response signal between the first portable device 31 and the on-board device 1 have been accomplished. In the second example, both the first portable device 31 and the second portable device 32 are present inside the vehicle or near the outside of the vehicle and the first response signals are transmitted at the same timing from the first portable device 31 and the second portable device 32, so there are cases in which the on-board device 1 fails to receive the first response signal.

However, the on-board device 1 can receive the second response signal transmitted from the first portable device 31. Accordingly, the on-board device 1 can accomplish the vehicle inside/outside determination for the first portable device 31 on the basis of the second response signal transmitted from the first portable device 31. In the second example, the first portable device 31 is inside the trunk, so a warning can be issued to the effect that the portable device 3 is being locked in the trunk. That is, the on-board device can issue a warning on the basis of the second response signal transmitted first from the first portable device 31, without waiting for the second response signal transmitted from the second portable device 32.

Third Example

Figure 21A:
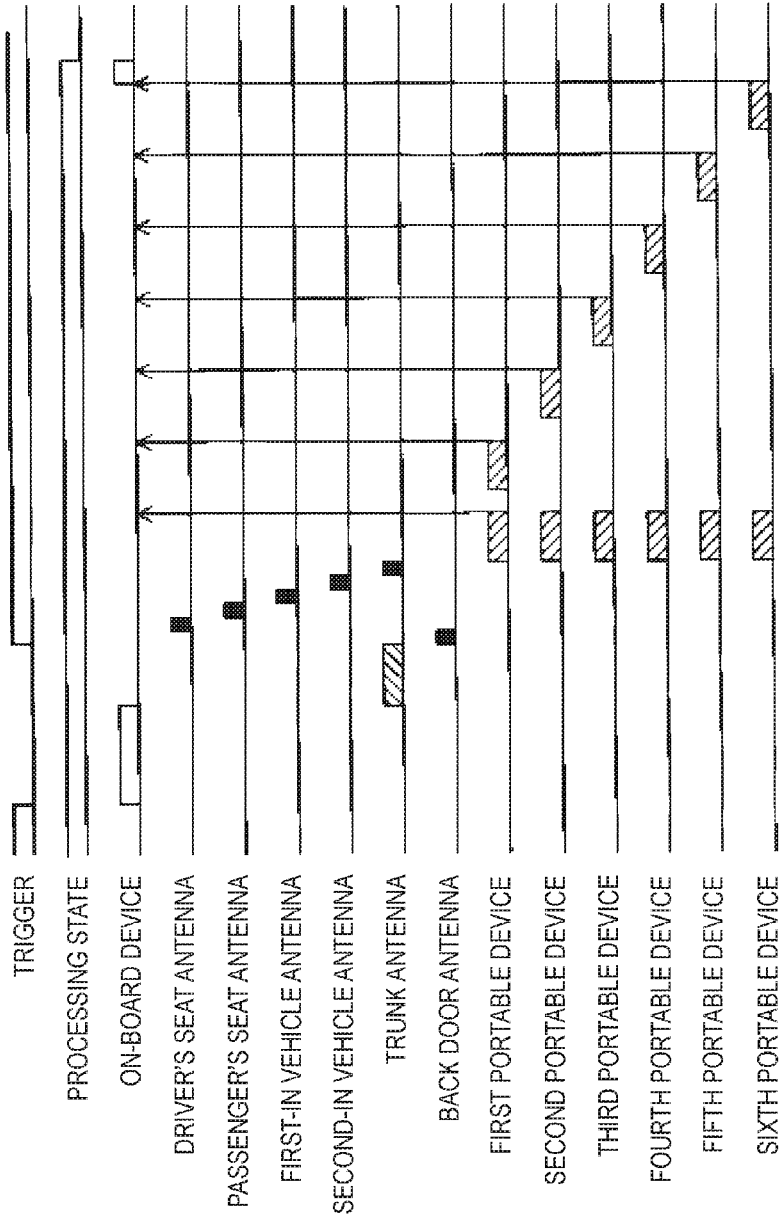
FIG. 21 is an explanatory diagram showing a third example of processing related to trunk lock-in prevention.
Figure 21B:
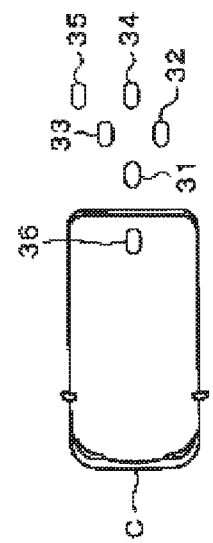
Figure 22:
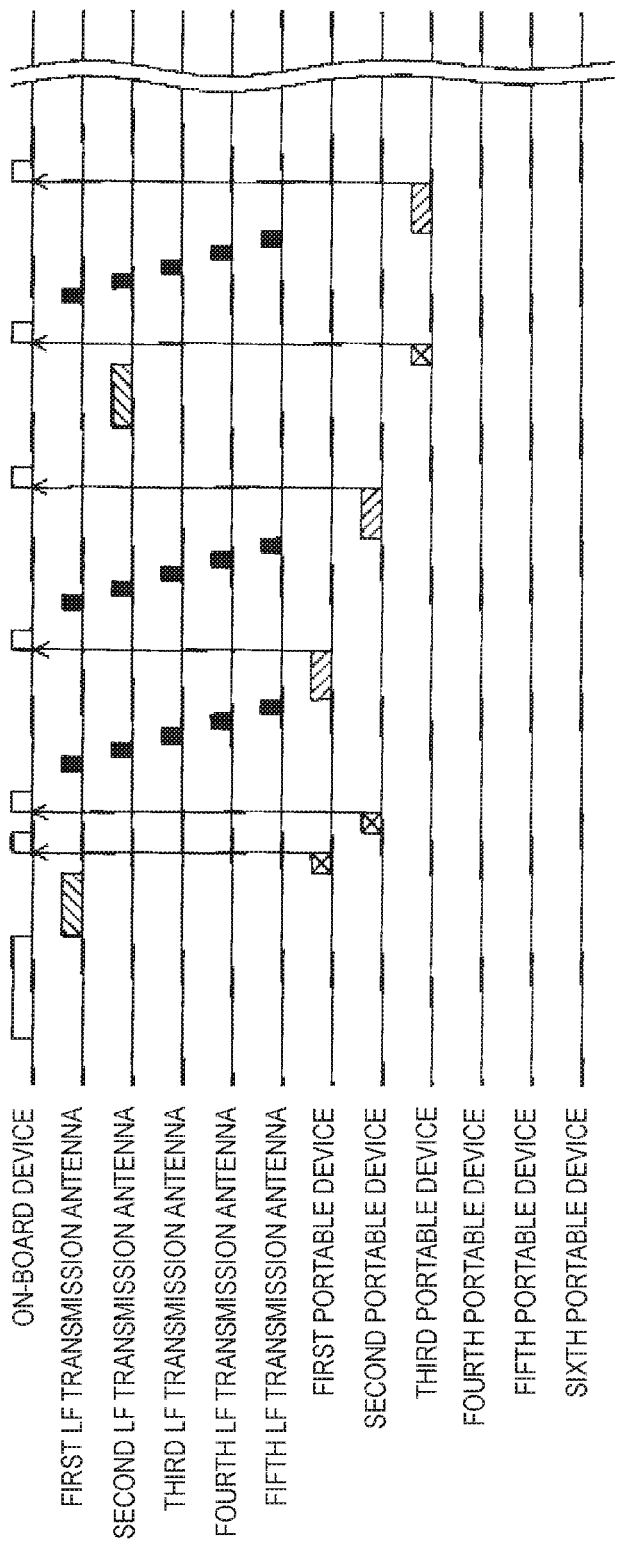
FIG. 22 is a timing chart showing signals transmitted and received in position detection processing of a portable device in conventional technology.

FIG. 21 is an explanatory diagram showing a third example of processing related to preventing trunk lock-in. The third example is a case in which the first through fifth portable devices 31, 32, . . . , 35 are outside the vehicle and the sixth portable device 36 is inside the trunk, as shown in FIG. 21B. The sequence of transmitting and receiving the processing start signal, the detection signals for vehicle inside/outside determination and the response signals is the same as in the second example. In the third example, the first through sixth portable devices 31, 32, . . . , 36 are present inside the vehicle or near the outside of the vehicle, and because the first response signals are transmitted from the first through sixth portable devices 31, 32, . . . , 36 at the same timing, as shown in FIG. 21A, there are cases in which the on-board device 1 fails to receive the first response signals. However, the on-board device 1 can receive the second response signal transmitted from the first portable device 31 and can accomplish the vehicle inside/outside determination for the first portable device 31 on the basis of the second response signal. In the third example, the first portable device 31 is outside the vehicle, so warning processing is not executed. Similarly, vehicle inside/outside determinations are accomplished for the second through fifth portable devices 32, 33, 34 and 35, but because these are all present outside the vehicle, warning processing is not executed. Lastly, the on-board device 1 receives the second response signal transmitted from the sixth portable device 36 and accomplishes the vehicle inside/outside determination for the sixth portable device 36 on the basis of the second response signal received. Because the sixth portable device 36 is present inside the trunk, the on-board device 1 can execute warning processing on the basis of the second response signal received from the sixth portable device 36. The third example is a case in which the sixth portable device 36, which has the most delayed transmission timing for the second response signal, is inside the trunk, but at the latest, it is possible to execute warning processing on the basis of the second response signal from the sixth portable device 36. The third example is an example in which warning processing is most delayed, but because the structure is such that the processing start signal and detection signals for vehicle inside/outside determination are transmitted successively with differing timing to each of the portable devices 3, it is possible to accomplish vehicle inside/outside determination, and execute warning processing to prevent trunk lock-in, more efficiently than in a conventional on-board communication system.

With the on-board communication system, on-board device 1 and portable devices 3 according to the third embodiment, it is possible to shorten the time needed for position detection of the portable devices 3, the same as in the first embodiment, and enable stable communication of information between the on-board device 1 and the portable devices 3. Specifically, even when a plurality of portable devices 3 are present in the vicinity of the vehicle C, it is possible to efficiently accomplish communication between the on-board device 1 and the portable devices 3, to accomplish vehicle inside/outside determination for the portable devices 3 and to execute warning processing to prevent trunk lock-in.

The embodiments disclosed here are exemplary in every aspect, and should be considered as not being restrictive. The scope of the invention is indicated by the scope of the claims, not the meanings described above, and it is intended that equivalents of the claim scope, and all modifications within the scope, are included.

BRIEF DESCRIPTION OF THE SYMBOLS 1 on-board device
2 portable device
10 on-board control unit
11 on-board reception unit
12 on-board transmission unit
13 storage unit for on-board device
14 timer unit for on-board device
21 RF reception antenna
22 LF transmission antenna
22a driver's seat antenna
22b passenger's seat antenna
22c first in-vehicle antenna
22d second in-vehicle antenna
22e back door antenna
31 first portable device
31a portable control unit
31b portable reception unit
31c received signal strength detection unit
31d reception antenna
31e portable transmission unit
31f RF transmission antenna
31g storage unit for portable device
31h timer unit for portable device
32 second portable device
33 third portable device
34 fourth portable device
35 fifth portable device
36 sixth portable device
41 driver's seat door switch
42 passenger's seat door switch
43 back door switch
44 door opened/closed detection switch
C vehicle

What is claimed is:

1. An on-board communication system, comprising: (i) an on-board device that transmits detection signals from a plurality of antennas disposed in a vehicle and (ii) a plurality of portable devices that each receive the detection signals transmitted from the on-board device and transmit response signals corresponding to the received detection signals, the on-board device performing position detection of each of the portable devices based on the response signals transmitted from each of the portable devices, wherein:
the detection signals are signals received in common by the plurality of portable devices,
the on-board device comprises:
an on-board transmission unit that, prior to transmission of the detection signals, transmits from the antennas a processing start signal for causing reception processing of the detection signals by each of the portable devices to start, and then transmits the detection signals from the antennas, and
an on-board reception unit that receives the response signals transmitted from each of the portable devices, and
each of the portable devices comprises:
a portable reception unit that receives the processing start signal and the detection signals transmitted from the on-board device,
a timer unit that measures an elapsed time from when the portable reception unit receives the processing start signal, and
a portable transmission unit that (i) when the portable reception unit has received the detection signals, transmits a first response signal that includes information corresponding to the received detection signals, and (ii) when a specified time has elapsed from when the portable reception unit received the processing start signal, transmits a second response signal including the same information as the information included in the first response signal, the specified time being different for each of the plurality of portable devices, wherein
each portable device uses the same processing start signal as the basis of the start of timing.

2. The on-board communication system according to claim 1, wherein:
the on-board transmission unit is configured to successively transmit the detection signals from the plurality of antennas at different timings, and
(i) when a door switch of the vehicle is operated to be in an on state, the processing start signal is transmitted from an antenna, among the plurality of antennas, that corresponds to the operated door switch, and (ii) when an engine start switch is placed in an on state, the processing start signal is transmitted from an antenna, among the plurality of antennas, that transmits to a portable device, among the plurality of portable devices, that is inside the vehicle.

3. The on-board communication system according to claim 2, wherein:
the portable transmission unit transmits the first response signal when elapse of a first specified time has been measured by the timer unit, and transmits the second response signal when elapse of a second specified time has been measured by the timer unit, the second specified time being different for each portable device.

4. The on-board communication system according to claim 1, wherein:
the portable transmission unit transmits the first response signal when elapse of a first specified time has been measured by the timer unit, and transmits the second response signal when elapse of a second specified time has been measured by the timer unit, the second specified time being different for each portable device.

5. The on-board communication system according to claim 1, wherein a vehicle processing is performed, or not performed, depending on the identified position of the portable devices.

6. The on-board communication system according to claim 5, wherein the vehicle processing comprises door locking or unlocking processing, and is performed only if the identified position of at least one of the portable devices is outside the vehicle.

7. The on-board communication system according to claim 5, wherein the vehicle processing comprises engine start processing, and is performed only if the identified position of at least one of the portable devices is inside the vehicle.

8. The on-board communication system according to claim 5, wherein the vehicle processing comprises trunk lock-in prevention processing, and is performed only if the identified position of at least one of the portable devices is inside the vehicle.

9. A portable device that constitutes an on-board communication system in which (i) an on-board device transmits detection signals from a plurality of antennas disposed in a vehicle and (ii) a plurality of portable devices receive the detection signal transmitted from the on-board device and each transmit response signals corresponding to the received detection signal, the on-board device performing position detection of each of the portable devices by receiving the response signals transmitted from each of the portable devices, the portable device comprising:
a portable reception unit that (i) receives a processing start signal, transmitted from the on-board device, for causing reception processing of the detection signals to start prior to receiving the detection signals, and (ii) receives the detection signals transmitted from the on-board device;
a timer unit that measures an elapsed time from when the portable reception unit receives the processing start signal transmitted from the on-board device, and
a portable transmission unit that (i) when the portable reception unit has received the detection signals, transmits a first response signal that includes information corresponding to the received detection signals, and (ii) when a specified time has elapsed from when the portable reception unit received the processing start signal, transmits a second response signal including the same information as the information included in the first response signal, the specified time being different for each of the plurality of portable devices, wherein
each portable device uses the same processing start signal as the basis of the start of timing.

10. The portable device according to claim 9, wherein:
the portable transmission unit transmits the first response signal when elapse of the first specified time has been measured by the timer unit, and transmits the second response signal when elapse of the second specified time has been measured by the timer unit, the second specified time being different for each portable device.

* * * * *